US012451614B2

(12) United States Patent
Okita et al.

(10) Patent No.: US 12,451,614 B2
(45) Date of Patent: Oct. 21, 2025

(54) INTELLIGENT REFLECTING SURFACE AND PHASED ARRAY ANTENNA

(71) Applicant: Japan Display Inc., Tokyo (JP)

(72) Inventors: Mitsutaka Okita, Tokyo (JP); Shinichiro Oka, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 144 days.

(21) Appl. No.: 18/530,249

(22) Filed: Dec. 6, 2023

(65) Prior Publication Data

US 2024/0106132 A1 Mar. 28, 2024

Related U.S. Application Data

(63) Continuation of application No. PCT/JP2022/019636, filed on May 9, 2022.

(30) Foreign Application Priority Data

Jun. 9, 2021 (JP) ................................ 2021-096658

(51) Int. Cl.
*H01Q 3/36* (2006.01)
*G02F 1/13* (2006.01)
*H01P 1/18* (2006.01)
*H01Q 15/14* (2006.01)
*H01Q 21/24* (2006.01)

(52) U.S. Cl.
CPC ......... *H01Q 15/148* (2013.01); *H01Q 21/245* (2013.01)

(58) Field of Classification Search
None
See application file for complete search history.

(56) References Cited

U.S. PATENT DOCUMENTS 10,862,182 B2 * 12/2020 Gölden .................... H01Q 3/44
11,069,976 B1 * 7/2021 Xi ........................ H01Q 21/065
11,128,044 B2 * 9/2021 Asagi ................ H01Q 21/0012
12,126,065 B2 * 10/2024 Liu ......................... H01P 1/181
12,160,051 B2 * 12/2024 Jia .......................... H01P 1/184
2018/0083364 A1 3/2018 Foo

FOREIGN PATENT DOCUMENTS

JP H11-103201 A 4/1999
JP 2019-530387 A 10/2019

* cited by examiner

*Primary Examiner* — Tho G Phan
(74) *Attorney, Agent, or Firm* — XSENSUS LLP

(57) ABSTRACT

According to one embodiment, an intelligent reflecting surface includes a first substrate, a second substrate, a sealing material, a liquid crystal layer, and a first transfer. The first substrate includes a plurality of patch electrodes, and a first power supply pad. The second substrate includes a common electrode, and a first power receiving pad electrically connected to the common electrode. The first transfer is in contact with the first power supply pad and the first power receiving pad. An uppermost layer of the first power supply pad, which is in contact with the first transfer, is formed of a transparent conductive material. The first power receiving pad is formed of a transparent conductive material. The common electrode is formed of metal.

15 Claims, 13 Drawing Sheets

INTELLIGENT REFLECTING SURFACE AND PHASED ARRAY ANTENNA

CROSS-REFERENCE TO RELATED APPLICATIONS

This application is a Continuation application of PCT Application No. PCT/JP2022/019636, filed May 9, 2022 and based upon and claiming the benefit of priority from Japanese Patent Application No. 2021-096658, filed Jun. 9, 2021, the entire contents of all of which are incorporated herein by reference.

FIELD

Embodiments described herein relate generally to an intelligent reflecting surface and a phased array antenna.

BACKGROUND

A phase shifter using liquid crystal has been developed as a phase shifter used in a phased array antenna that is capable of electrically controlling directionality. In a phased array antenna, a plurality of antenna elements to which high-frequency signals are transmitted from corresponding phase shifters are arranged one-dimensionally (or two-dimensionally). In the phased array antenna as described above, the dielectric constant of the liquid crystal needs to be adjusted such that the phase difference between the high-frequency signals input to adjacent antenna elements becomes constant.

In addition, intelligent reflecting surfaces capable of controlling a direction of radio wave reflection using the liquid crystal, similarly to the phased array antennas, has been studied. On this intelligent reflecting surface, reflection controllers including reflecting electrodes are arranged one-dimensionally (or two-dimensionally). On the intelligent reflecting surface, the dielectric constant of the liquid crystal also needs to be adjusted such that a phase difference between reflected radio waves becomes constant between the adjacent reflection controllers.

BRIEF DESCRIPTION OF THE DRAWINGS

FIG. 3 is a plan view showing the intelligent reflecting surface, illustrating a common electrode, a transparent conductive layer, a power supply pad, and the like.

FIG. 9 is a plan view showing the intelligent reflecting surface according to modified example 1 of the first embodiment, illustrating the common electrode, the transparent conductive layer, the power supply pad, and the like.

FIG. 15 is a plan view showing the phased array antenna, illustrating a common electrode, a transparent conductive layer, a power supply pad, and the like.

FIG. 17 is a plan view showing the phased array antenna according to modified example 1 of the third embodiment, illustrating the common electrode, the transparent conductive layer, the power supply pad, and the like.

DETAILED DESCRIPTION

Figure 1:
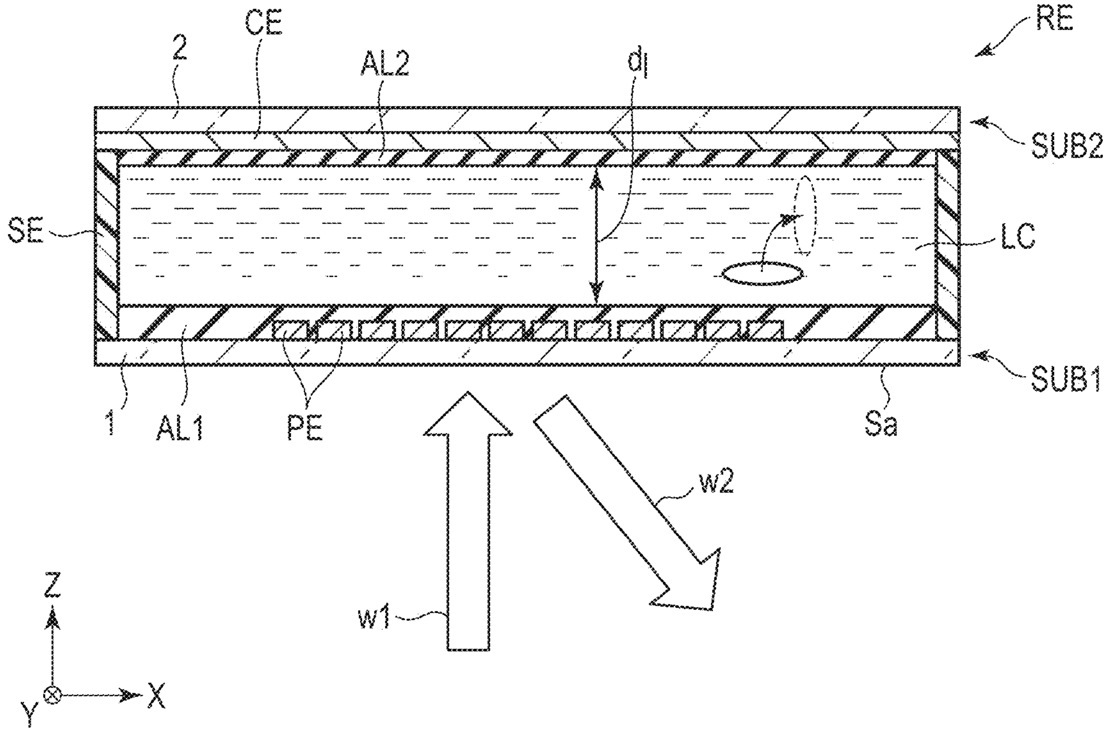
FIG. 1 is a cross-sectional view showing an intelligent reflecting surface according to a first embodiment.

In general, according to one embodiment, there is provided an intelligent reflecting surface comprising: a first substrate including a plurality of patch electrodes located in a first area, spaced apart along each of an X-axis and a Y-axis orthogonal to each other, and arrayed in a matrix, and a first power supply pad located in a second area outside the first area; a second substrate including a common electrode located in the first area and opposed to the plurality of patch electrodes in a direction parallel to a Z-axis orthogonal to each of the X-axis and the Y-axis, and a first power receiving pad located in the second area, electrically connected to the common electrode, and overlapped with the first power supply pad in the direction parallel to the Z-axis; a sealing material located in the second area to bond the first substrate to the second substrate; a liquid crystal layer held between the first substrate and the second substrate and surrounded by the sealing material; and a first transfer that is in contact with the first power supply pad and the first power receiving pad, wherein an uppermost layer of the first power supply pad, which is in contact with the first transfer, is formed of a transparent conductive material, the first power receiving pad is formed of a transparent conductive material, and the common electrode is formed of metal.

According to another embodiment, there is provided a phased array antenna comprising: a first substrate including a plurality of antennas located in an emission area and arranged to be spaced apart along an X-axis, a plurality of phase control electrodes located in a phase control area adjacent to the emission area and being electrically independent of each other, and a first power supply pad located in a non-emission area outside the emission area and the phase control area; a second substrate including a common electrode located in the phase control area and opposed to the plurality of phase control electrodes in a direction parallel to a Z-axis orthogonal to the X-axis, and a first power receiving pad located in the non-emission area, electrically connected to the common electrode, and overlapped with the first power supply pad in the direction parallel to the Z-axis; a sealing material surrounding the phase control area and bonding the first substrate to the second substrate; a liquid crystal layer held between the first substrate and the second substrate and surrounded by the sealing material; and a first transfer that is in contact with the first power supply pad and the first power receiving pad, wherein an uppermost layer of the first power supply pad, which is in contact with the first transfer, is formed of a transparent conductive material, the first power receiving pad is formed of a transparent conductive material, and the common electrode is formed of metal.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented, but such schematic illustration is merely exemplary, and in no way restricts the interpretation of the invention. Besides, in the specification and drawings, the same elements as those described in connection with preceding drawings are denoted by like reference numbers, and a detailed description thereof is omitted unless necessary.

First Embodiment

First, a first embodiment will be described. FIG. 1 is a cross-sectional view showing an intelligent reflecting surface RE according to the present embodiment. The intelligent reflecting surface RE can reflect radio waves and functions as a relay device for radio waves.

As shown in FIG. 1, the intelligent reflecting surface RE comprises a first substrate SUB1, a second substrate SUB2, and a liquid crystal layer LC. The first substrate SUB1 includes an electrically insulating basement 1, a plurality of patch electrodes PE, and an alignment film AL1. The basement 1 is formed in a flat plate shape and extends along an X-Y plane including an X-axis and a Y-axis that are orthogonal to each other. The alignment film AL1 covers the plurality of patch electrodes PE.

The second substrate SUB2 is opposed to and spaced from the first substrate SUB1 with a predetermined gap. The second substrate SUB2 includes an electrically insulating basement 2, a common electrode CE, and an alignment film AL2. The basement 2 is formed in a flat plate shape and extends along the X-Y plane. The basement 1 and the basement 2 are formed of glass. However, the basement 1 and the basement 2 may be formed of an insulating material other than glass, such as resin.

The common electrode CE is opposed to the plurality of patch electrodes PE in a direction parallel to the Z-axis orthogonal to each of the X-axis and the Y-axis. The alignment film AL2 covers the common electrode CE. In the present embodiment, each of the alignment film AL1 and the alignment film AL2 is a horizontal alignment film.

The first substrate SUB1 and the second substrate SUB2 are joined by sealing materials SE arranged on their respective peripheral edges. The liquid crystal layer LC is provided in a space surrounded by the first substrate SUB1, the second substrate SUB2, and the sealing materials SE. The liquid crystal layer LC is held between the first substrate SUB1 and the second substrate SUB2. The liquid crystal layer LC is opposed to the plurality of patch electrodes PE on one hand and opposed to the common electrode CE on the other hand.

A thickness (cell gap) of the liquid crystal layer LC is referred to as $d_1$. The thickness $d_1$ is larger than the thickness of the liquid crystal layer of a normal liquid crystal display panel, for example, approximately 5 to 20 times that of a normal liquid crystal display device. In the present embodiment, the thickness $d_1$ is 50 μm. However, the thickness $d_1$ may be less than 50 μm as long as the reflection phase of radio waves can be sufficiently adjusted. Alternatively, the thickness $d_1$ may exceed 50 μm in order to increase the reflection angle of radio waves. The liquid crystal material used for the liquid crystal layer LC of the intelligent reflecting surface RE is different from the liquid crystal material used for an ordinary liquid crystal display panel. The above-described reflection phase of the radio waves will be described later.

A common voltage is applied to the common electrode CE, and the potential of the common electrode CE is fixed. In the present embodiment, the common voltage is 0 V. A voltage is also applied to the patch electrodes PE. In the present embodiment, the patch electrodes PE are AC-driven. The liquid crystal layer LC is driven by a so-called longitudinal electric field. A voltage applied between the patch electrodes PE and the common electrode CE acts on the liquid crystal layer LC, thereby changing the dielectric constant of the liquid crystal layer LC.

When the dielectric constant of the liquid crystal layer LC changes, the propagation speed of radio waves in the liquid crystal layer LC also changes. For this reason, the reflection phase of radio waves can be adjusted by adjusting the voltage applied to the liquid crystal layer LC. As a result, the reflection direction of radio waves can be adjusted. In the present embodiment, an absolute value of the voltage applied to the liquid crystal layer LC is 10 V or less. This is because the dielectric constant of the liquid crystal layer LC is saturated at 10 V. However, the absolute value of the voltage applied to the liquid crystal layer LC may exceed 10 V. For example, when improvement of the response speed of the liquid crystal is required, a voltage of 10 V or less may be applied to the liquid crystal layer LC after a voltage exceeding 10 V is applied to the liquid crystal layer LC.

The first substrate SUB1 has an incidence surface Sa on the side opposite to the side opposed to the second substrate SUB2. In the figure, an incident wave w1 is a radio wave made incident on the intelligent reflecting surface RE, and a reflected wave w2 is a radio wave reflected on the intelligent reflecting surface RE.

Figure 2:
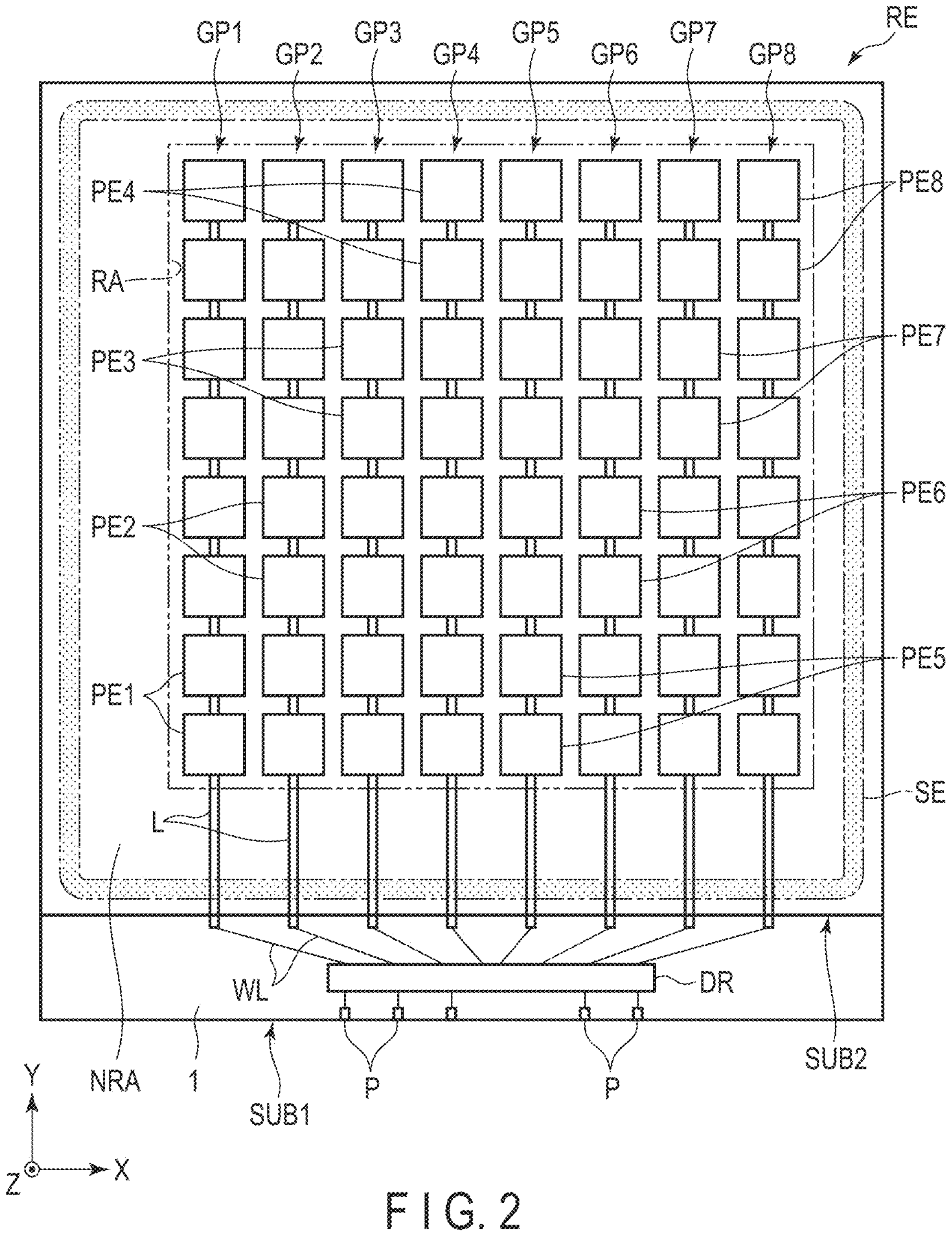
FIG. 2 is a plan view showing the intelligent reflecting surface shown in FIG. 1.

FIG. 2 is a plan view showing the intelligent reflecting surface RE shown in FIG. 1. As shown in FIG. 2, the plurality of patch electrodes PE are arranged in a matrix at intervals along each of the X-axis and the Y-axis. In the X-Y plane, the plurality of patch electrodes PE have the same shape and the same size.

The plurality of patch electrodes PE are located in the reflective area RA, arranged at regular intervals along the X-axis, and arranged at regular intervals along the Y-axis. The plurality of patch electrodes PE are included in a plurality of patch electrode groups GP extending along the Y-axis and arranged along the X-axis. The plurality of patch electrode groups GP include a first patch electrode group GP1 to an eighth patch electrode group GP8.

The first patch electrode group GP1 includes a plurality of first patch electrodes PE1, the second patch electrode group GP2 includes a plurality of second patch electrodes PE2, the third patch electrode group GP3 includes a plurality of third patch electrodes PE3, the fourth patch electrode group GP4 includes a plurality of fourth patch electrodes PE4, the fifth patch electrode group GP5 includes a plurality of fifth patch electrodes PE5, the sixth patch electrode group GP6 includes a plurality of sixth patch electrodes PE6, the seventh patch electrode group GP7 includes a plurality of seventh patch electrodes PE7, and the eighth patch electrode group GP8 includes a plurality of eighth patch electrodes PE8. For example, the second patch electrode PE2 is located between the first patch electrode PE1 and the third patch electrode PE3 in the direction along the X-axis.

Each patch electrode group GP includes a plurality of patch electrodes PE arranged along the Y-axis and electrically connected to each other. In the present embodiment, the plurality of patch electrodes PE of each patch electrode group GP are electrically connected by connection lines L. The first substrate SUB1 includes the plurality of connection lines L extending along the Y-axis and arranged along the X-axis. The connection lines L extend to an area of the basement 1, which is not opposed to the second substrate SUB2. Unlike the present embodiment, the plurality of connection lines L may be connected to the plurality of patch electrodes PE in one-to-one relationship.

A drive circuit DC is mounted on an area of the first substrate SUB1, which is not opposed to the second substrate SUB2. The drive circuit DC is composed of an integrated circuit. Each wiring line WL connects one connection line L with the drive circuit DC. The drive circuit DC is connected to pads p of outer lead bonding (OLB).

In the present embodiment, the plurality of patch electrodes PE arranged along the Y-axis, the connection lines L, and the wiring line WL are integrally formed of the same conductor. Incidentally, the plurality of patch electrodes PE, the connection lines L, and the wiring line WL may be formed of conductors different from each other. The patch electrodes PE, the connection lines L, the wiring lines WL, and the common electrode CE are formed of metal or a conductor equivalent to metal. For example, the patch electrodes PE, the connection lines L, and the wiring lines WL may be formed of a transparent conductive material such as indium tin oxide (ITO).

The connection line L is a fine wire, and a width of the connection line L is sufficiently smaller than a length Px which will be described later. The width of the connection line L is several μm to several tens of μm, and is on the order of μm. If the width of the connection line L is made too large, the sensitivity to the frequency component of the radio waves is changed, which is not desirable. More specifically, if the line width is approximately 1% or less of the width and diameter of the patch electrode, the inadvertent influence on the incident wave can be reduced.

The sealing material SE is located in the non-reflective area NRA outside the reflective area RA, and is arranged at the peripheral edge of the area where the first substrate SUB1 and the second substrate SUB2 face each other. Incidentally, the above-described liquid crystal layer LC is formed by a drop injection method, but may be formed by a liquid crystal injection method using a capillary action. In the latter case, a liquid crystal injection port is formed in the sealing material SE, and a liquid crystal material is injected from the liquid crystal injection port into a space surrounded by the first substrate SUB1, the second substrate SUB2, and the sealing material SE, and the liquid crystal injection port is sealed with a sealing material.

FIG. 2 shows an example in which eight patch electrodes PE are arranged in the direction along the X-axis and the direction along the Y-axis. However, the number of patch electrodes PE can be variously modified. For example, hundred patch electrodes PE may be arranged in the direction along the X-axis, and a plurality of (for example, hundred) patch electrodes PE may be arranged in the direction along the Y-axis. A length of the intelligent reflecting surface RE (first substrate SUB1) in the direction along the X-axis is, for example, 40 to 80 cm.

Figure 3:
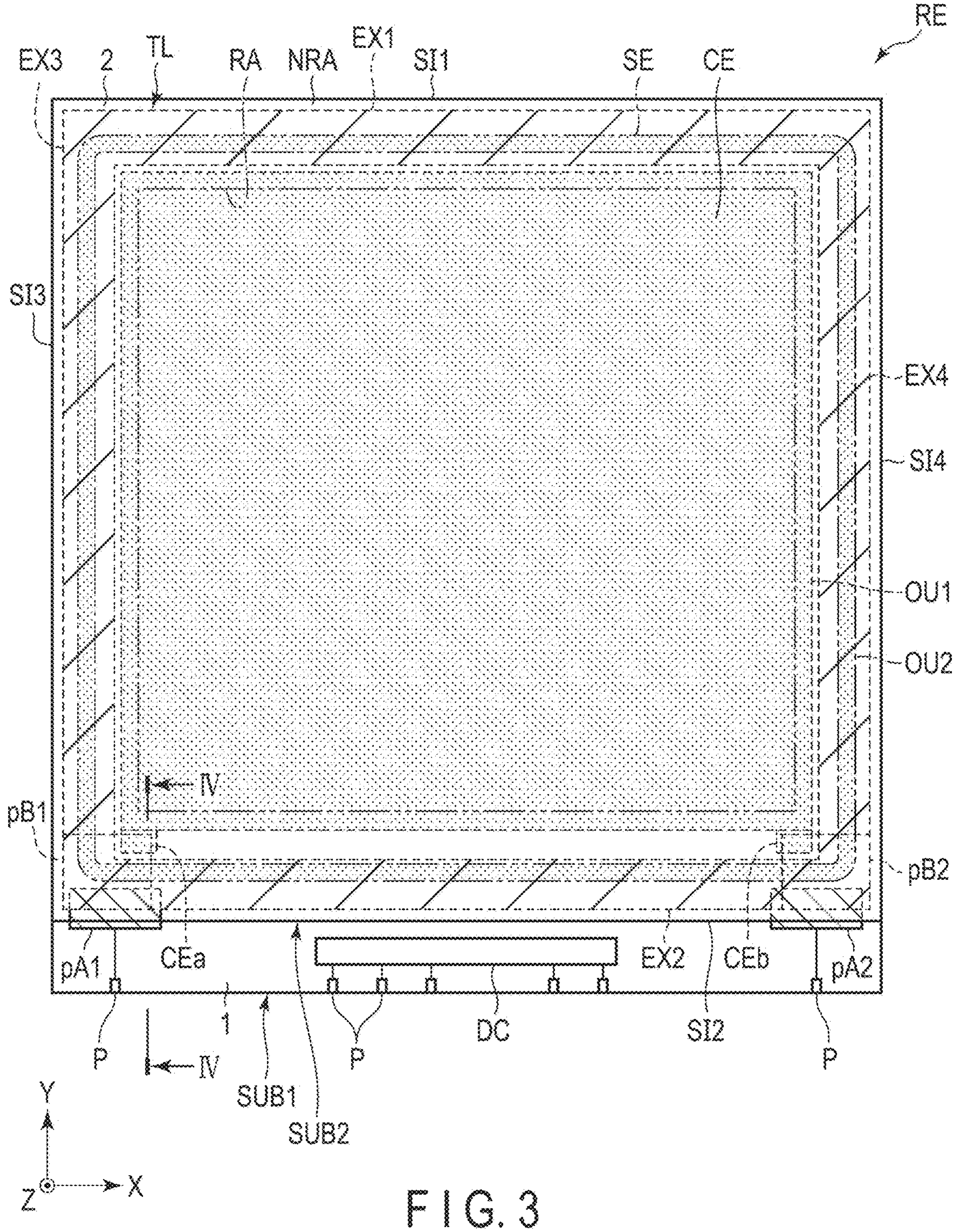

FIG. 3 is a plan view showing the intelligent reflecting surface RE, illustrating the common electrode CE, the transparent conductive layer TL, the power supply pads pA1 and pA2, and the like. In the drawing, each of the common electrode CE and the sealing material SE is marked with a dot pattern, the transparent conductive layer TL is marked with a right-upward diagonal line, and the power supply pads pA1 and pA2 are marked with right-downward diagonal lines.

As shown in FIG. 3, the first substrate SUB1 includes the power supply pad pA1 serving as a first power supply pad and the power supply pad pA2 serving as a second power supply pad. The power supply pads pA1 and pA2 are located in the non-reflective area NRA and opposed to the second substrate SUB2. The power supply pads pA1 and pA2 are connected to the pads p of the OLB, respectively, but may be connected to the drive circuit DC.

The second substrate SUB2 includes the basement 2, the common electrode CE, and the transparent conductive layer TL. The common electrode CE is located in the reflective area RA and extends in the non-reflective area NRA. The basement 2 is located in the reflective area RA and the non-reflective area NRA.

The transparent conductive layer TL is formed of a transparent conductive material such as ITO. In the present embodiment, the transparent conductive layer TL is located in the non-reflective area NRA. In addition, the transparent conductive layer TL includes an extending portion EX, a power receiving pad pB1 serving as a first power receiving pad, and a power receiving pad pB2 serving as a second power receiving pad.

The extending portion EX is provided to be spaced from the common electrode CE in plan view. The extending portion EX includes a first extending portion EX1, a second extending portion EX2, a third extending portion EX3, and a fourth extending portion EX4. The first extending portion EX1 is located between the common electrode CE and an upper side SI1 of the basement 2 and extends along the X-axis. The second extending portion EX2 is located between the common electrode CE and a lower side SI2 of the basement 2 and extends along the X-axis. The third extending portion EX3 is located between the common electrode CE and a left side SI3 of the basement 2, is provided continuously from the first extending portion EX1, and extends along the Y-axis. The fourth extending portion EX4 is located between the common electrode CE and a right side SI4 of the basement 2, is provided continuously from the first extending portion EX1, and extends along the Y-axis.

The power receiving pad pB1 is located in the non-reflecting area NRA and is provided continuously from each of the second extending portion EX2 and the third extending portion EX3. The power receiving pad pB1 overlaps with each of the power supply pad pA1 and a protruding portion CEa of the common electrode CE in a direction parallel to the Z-axis. The protruding portion CEa is located between the reflective area RA and the lower side SI2.

The power receiving pad pB2 is located in the non-reflective area NRA and is provided continuously from each of the second extending portion EX2 and the fourth extending portion EX4. The power receiving pad pB2 overlaps with each of the power supply pad pA2 and a protruding portion CEb of the common electrode CE in the direction parallel to the Z-axis. The protruding portion CEb is located between the reflective area RA and the lower side SI2.

As described above, the first extending portion EX1, the second extending portion EX2, the third extending portion EX3, the fourth extending portion EX4, the power receiving pad pB1, and the power receiving pad pB2 are integrally formed to constitute a transparent conductive layer TL.

In plan view, an outer periphery OU1 of the common electrode CE is located on a side closer to the reflective area RA than an outer periphery OU2 of the sealing material SE. The sealing material SE, the basement 1, the basement 2, and the like protect the common electrode CE against air (moisture). Therefore, corrosion of the common electrode CE can be suppressed.

Figure 4:
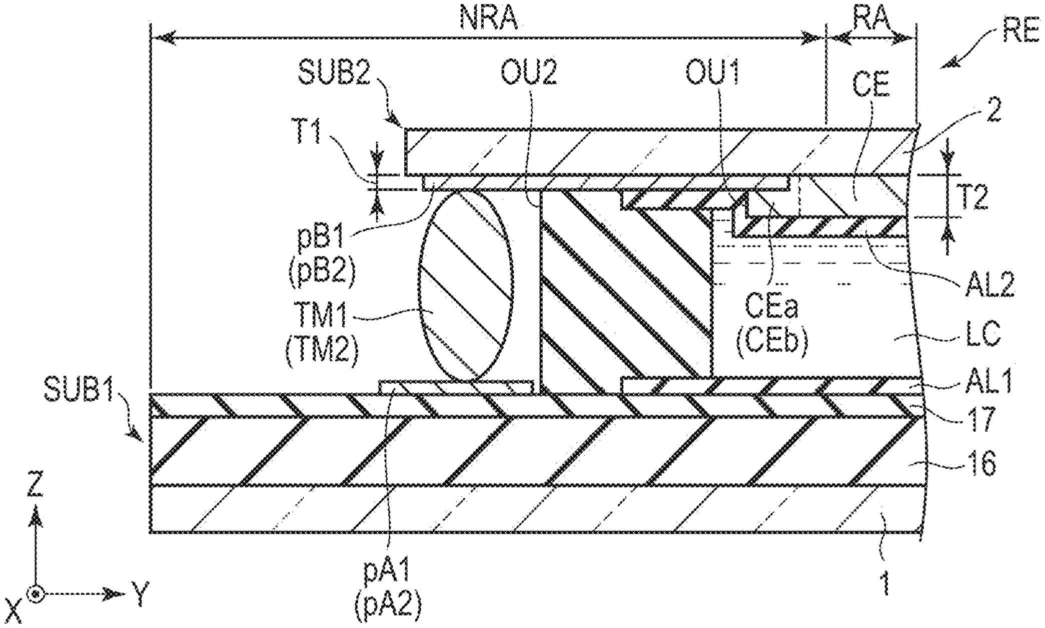
FIG. 4 is a cross-sectional view showing the intelligent reflecting surface along line IV-IV in FIG. 3.

FIG. 4 is a cross-sectional view showing the intelligent reflecting surface RE along line IV-IV in FIG. 3.

As shown in FIG. 4, the first substrate SUB1 includes the basement 1, an insulating layer 16, an insulating layer 17, the power supply pad pA1, the alignment film AL1, and the like. The insulating layer 16 is formed above the basement 1. An insulating layer (not shown) is interposed between the basement 1 and the insulating layer 16, but description of a configuration between the basement 1 and the insulating layer 16 is omitted here.

The insulating layer 17 is formed on the insulating layer 16. The power supply pad pA1 and the alignment film AL1 are formed on the insulating layer 17. Each of the insulating layers 16 and 17 is formed of an inorganic insulating layer or an organic insulating layer. In the present embodiment, the insulating layer 16 is an organic insulating layer and is formed of, for example, resin. The insulating layer 17 is an inorganic insulating layer and is formed of, for example, silicon nitride (SiN).

The power receiving pad pB1 is electrically connected to the common electrode CE. The common electrode CE is in contact with the power receiving pad pB1 in the non-reflective area NRA. More specifically, the common electrode CE is in contact with the power receiving pad pB1 in an area on a side closer to the reflective area RA than to the sealing material SE.

The common electrode CE has a three-layer stacked structure (Ti-based/Al-based/Ti-based) and includes a lower layer formed of a metal material containing Ti as its main component, such as titanium (Ti) or an alloy containing Ti, an intermediate layer formed of a metal material containing Al as its main component, such as aluminum (Al) or an alloy containing Al, and an upper layer formed of a metal material containing Ti as its main component, such as Ti or an alloy containing Ti. The common electrode CE is formed of so-called TAT. The above-described patch electrode PE is also formed of TAT.

Incidentally, the common electrode CE and the patch electrodes PE may be formed of metal other than TAT. For example, the common electrode CE and the patch electrodes PE may be formed of so-called MAM. In this case, the common electrode CE has a three-layer stacked structure (Mo-based/Al-based/Mo-based) and includes a lower layer formed of a metal material containing Mo as its main component, such as molybdenum (Mo) or an alloy containing Mo, an intermediate layer formed of a metal material containing Al as its main component, such as Al or an alloy containing Al, and an upper layer formed of a metal material containing Mo as its main component, such as Mo or an alloy containing Mo.

In the direction parallel to the Z-axis, the power receiving pad pB1 has a thickness T1, and the common electrode CE has a thickness T2. The thickness T1 is 50 to 100 nm. The thickness T2 is 800 to 1200 nm. In order to reduce the resistance of the common electrode CE, the common electrode CE has a large thickness T2 as described above. The area of the side surface of the intermediate layer containing Al as a main component, in the common electrode CE, is approximately proportional to the thickness T2.

As the area of the side surface of the intermediate layer is larger, the concern about corrosion of the intermediate layer becomes greater. For this reason, the present embodiment provides an intelligent reflecting surface RE in which the intermediate layer (common electrode CE) is resistant to corrosion, as described above and later.

In the non-reflective area NRA, the power receiving pad pB1 is located between the basement 2 and the common electrode CE in the direction parallel to the Z-axis. In the process of manufacturing the second substrate SUB2, the common electrode CE is formed after the power receiving pad pB1 is formed. Therefore, corrosion of the common electrode CE can be suppressed and, particularly, corrosion of the side surface of the intermediate layer containing Al as its main component, of the common electrode CE, can be suppressed as compared to a case of forming the power receiving pad pB1 after forming the common electrode CE.

The intelligent reflecting surface RE further comprises a transfer TM1 as a first transfer. The transfer TM1 is located outside the sealing material SE. In other words, the sealing material SE is located between the transfer TM1 and the common electrode CE. From the viewpoint of product reliability, the transfer TM1 is arranged so as not to be in contact with the liquid crystal layer LC.

The transfer TM1 is in contact with the power supply pad pA1 and the power receiving pad pB1. Therefore, the power supply pad pA1 can apply a voltage (common voltage) to the power receiving pad pB1 via the transfer TM1.

The power supply pad pA1 and the power receiving pad pB1 are located outside the intelligent reflecting surface RE from the sealing material SE and are exposed to the atmosphere. However, the power receiving pad pB1 is formed of a transparent conductive material. The uppermost layer of the power supply pad pA1, which is in contact with the transfer TM1, is formed of a transparent conductive material such as ITO. For this reason, corrosion of the power supply pad pA1 and the power receiving pad pB1 can be suppressed as compared to a case where the power receiving pad pB1 is formed of Al and the uppermost layer of the power supply pad pA1 is formed of Al.

The power supply pad pA1 may have a single-layer structure composed of a transparent conductive layer but may have a stacked structure including a metal layer and a transparent conductive layer.

In addition, the uppermost layer of the power supply pad pA1 and the power receiving pad pB1 may be formed of a material which is less likely to corrode than Al. The uppermost layer of the power supply pad pA1 and the power receiving pad pB1 may not be formed of a transparent conductive material such as ITO, but a non-Al-based material, and may be formed of, for example, a metal such as molybdenum (Mo) or tungsten (W).

The relationship among the power supply pad pA1, the power receiving pad pB1, the transfer TM1, the protruding portion CEa, and the like has been focused in FIG. 4, but the relationship among the power supply pad pA2, the power receiving pad pB2, the transfer TM2 serving as the second transfer, the protruding portion CEb, and the like has also been focused. When the relationship among the power supply pad pA2, the power receiving pad pB2, the transfer TM2, the protruding portion CEb, and the like is focused, the power supply pad pA1 may be replaced with the power supply pad pA2, the power receiving pad pB1 may be replaced with the power receiving pad pB2, the transfer TM1 may be replaced with the transfer TM2, and the protruding portion CEa may be replaced with the protruding portion CEb, in FIG. 4. For example, the transfer TM2 is in contact with the power supply pad pA2 and the power receiving pad pB2.

Figure 5:
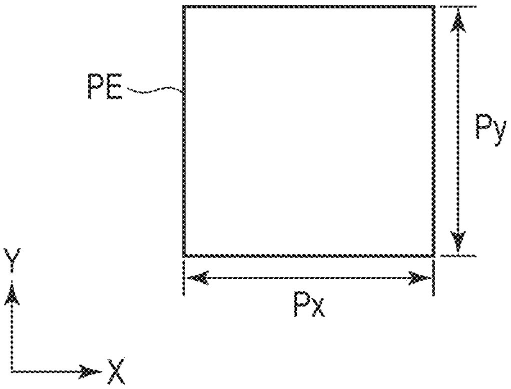
FIG. 5 is an enlarged plan view showing a patch electrode shown in FIG. 1 and FIG. 2.

FIG. 5 is an enlarged plan view showing the patch electrode PE shown in FIG. 1 and FIG. 2. As shown in FIG. 5, the patch electrode PE has a square shape. The shape of the patch electrode PE is not particularly limited, but a square or a perfect circle is desirable. When the external shape of the patch electrode PE is focused, a shape in which an aspect ratio of vertical and horizontal lengths is 1:1 is desirable. This is because it is desirable for the patch electrode PE to have a 90° rotationally symmetrical structure in order to accommodate horizontal polarization and vertical polarization.

The patch electrode PE has a length Px in a direction along the X-axis and a length Py in a direction along the Y-axis. The length Px and the length Py are desirably adjusted in accordance with the frequency range of the incident wave w1. Next, a desirable relationship between the frequency range of the incident wave w1 and the lengths Px and Py will be exemplified.

2.4 GHz: $Px=Py=35$ mm 5.0 GHz: $Px=Py=16.8$ mm

28 GHz: $Px=Py=3.0$ mm

Figure 6:
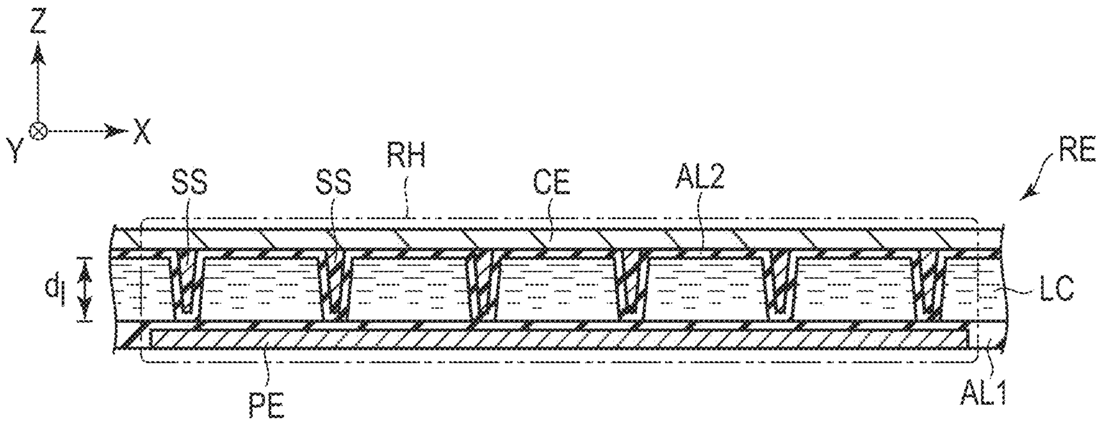
FIG. 6 is an enlarged cross-sectional view showing a part of the intelligent reflecting surface, illustrating a single reflection controller.

FIG. 6 is an enlarged cross-sectional view showing a part of the intelligent reflecting surface RE, illustrating a single reflection controller RH. In FIG. 6, illustration of the basement 1 and the like in FIG. 4 is omitted.

As shown in FIG. 6, a thickness $d_1$ (cell gap) of the liquid crystal layer LC is held by a plurality of spacers SS. In the present embodiment, the spacers SS are columnar spacers, formed in the second substrate SUB2, and protruding toward the first substrate SUB1 side.

The width of the spacer SS is 10 to 20 μm. While the length Px and the length Py of the patch electrode PE are on the order of mm, the width of the spacer SS is on the order of μm. For this reason, the plurality of spacers SS need to exist in the areas opposed to the patch electrodes PE. In addition, a ratio of the areas where the plurality of spacers SS exist, of the areas opposed to the patch electrodes PE is approximately 1%.

For this reason, even if the spacers SS exist in the above areas, the influence of the spacers SS on the reflected wave w2 is small. Incidentally, the spacers SS may be formed in the first substrate SUB1 to protrude toward the second substrate SUB2 side. Alternatively, the spacers SS may be spherical spacers.

The intelligent reflecting surface RE comprises a plurality of reflection controllers RH. Each reflection controller RH includes one patch electrode PE among the plurality of patch electrodes PE, a portion of the common electrode CE, which is opposed to the patch electrode PE, and an area of the liquid crystal layer LC, which is opposed to the patch electrode PE.

Figure 7:
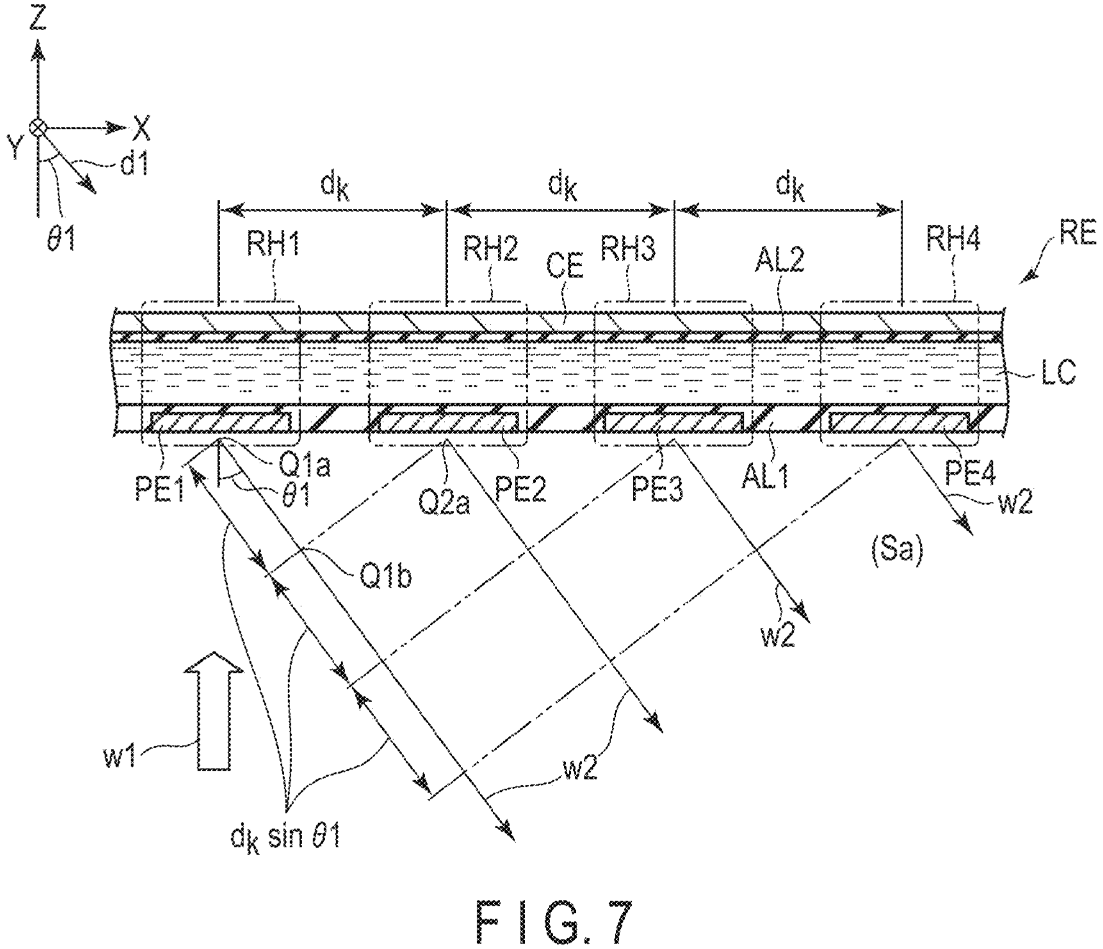
FIG. 7 is an enlarged cross-sectional view showing a part of the intelligent reflecting surface, illustrating a plurality of reflection controllers.

FIG. 7 is an enlarged cross-sectional view showing a part of the intelligent reflecting surface RE, illustrating a plurality of reflection controllers RH. In FIG. 7, illustration of the basement 1, the spacers SS, and the like is omitted.

As shown in FIG. 7, each of the reflection controllers RH functions to adjust the phase of the radio wave (incident wave w1) formed incident from the incidence surface Sa side in accordance with the voltage applied to the patch electrode PE, and urge the radio wave to be reflected to the incidence surface Sa side as the reflected wave w2. In each reflection controller RH, the reflected wave w2 is a synthetic wave of the radio wave reflected on the patch electrode PE and the radio wave reflected on the common electrode CE.

The patch electrodes PE are arranged at regular intervals in the direction along the X-axis. A length (pitch) between adjacent patch electrodes PE is referred to as $d_k$. The length $d_k$ corresponds to a distance from a geometric center of one patch electrode PE to a geometric center of the adjacent patch electrode PE. In the present embodiment, it is assumed that the reflected waves w2 have the same phase in the first reflection direction d1. On the X-Z plane of FIG. 7, the first reflection direction d1 is a direction forming a first angle θ1 with the Z axis. The first reflection direction d1 is parallel to the X-Z plane.

In order for the phases of the radio waves reflected on the plurality of reflection controllers RH to be aligned in the first reflection direction d1, the phases of the radio waves need only to be aligned on the linear two-dot chain line. For example, the phase of the reflected wave w2 at point Q1*b* and the phase of the reflected wave w2 at point Q2*a* may be aligned. A physical linear distance from point Q1*a* to point Q1*b* of the first patch electrode PE1 is $d_k \times \sin\theta 1$. For this reason, when the first reflection controller RH1 and the second reflection controller RH2 are focused, the phase of the reflected wave w2 from the second reflection controller RH2 may be delayed from the phase of the reflected wave w2 from the first reflection controller RH1 by a phase amount δ1. The phase amount 51 is represented by the following expression.

$$\delta 1 = d_k \times \sin\theta 1 \times 2\pi/\lambda$$

Figure 8:
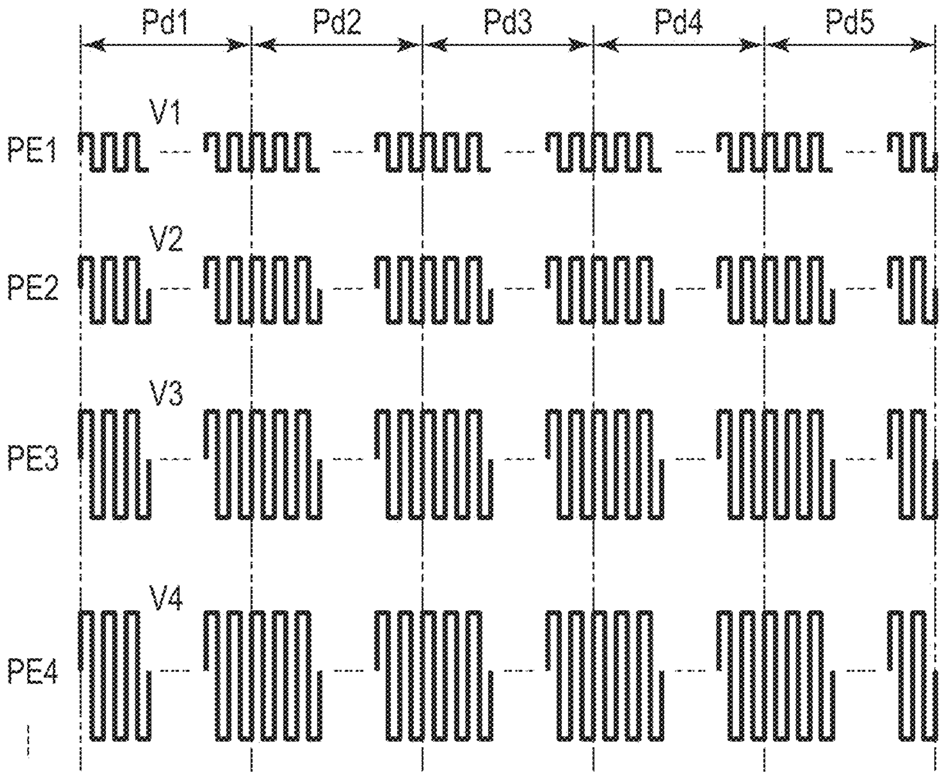
FIG. 8 is a timing chart showing changes in the voltage applied to the patch electrode for each period in a method of driving the intelligent reflecting surface of the embodiment.

Next, a method of driving the intelligent reflecting surface RE will be described. FIG. 8 is a timing chart showing changes in the voltages applied to the patch electrodes PE for each period in the method of driving the intelligent reflecting surface RE of the present embodiment. FIG. 8 shows a first period Pd1 to a fifth period Pd5 of the driving periods of the intelligent reflecting surface RE.

As shown in FIG. 7 and FIG. 8, when driving the intelligent reflecting surface RE is started, voltages V are applied to a plurality of patch electrodes PE such that the radio waves reflected on the plurality of reflection controllers RH have the same phase in the first reflection direction d1 during the first period Pd1. For example, a first voltage V1 is applied to the first patch electrode PE1, a second voltage V2 is applied to the second patch electrode PE2, a third voltage V3 is applied to the third patch electrode PE3, and a fourth voltage V4 is applied to the fourth patch electrode PE4. An absolute value of the voltage V applied to each patch electrode PE is the same over the entire period Pd.

When the potential of the common electrode CE is referred to as a reference, the polarity of the voltage applied to each patch electrode PE is periodically reversed. For example, the patch electrode PE is driven with a drive frequency of 60 Hz. As described above, the patch electrodes PE are AC-driven.

Even if the period Pd changes to another period Pd, the phase amount δ1 of the radio wave reflected on one reflection controller RH in the first reflection direction d1 and the radio wave reflected on the adjacent reflection controller RH in the first reflection direction d1 is maintained. In the present embodiment, the phase amount δ1 is 35°. For this reason, a phase difference of 245° is assigned between the radio waves reflected on the first reflection controller RH1 including the first patch electrode PE1 in the first reflection direction d1 and the radio waves reflected on the eighth reflection controller RH8 including the eighth patch electrode PE8 in the first reflection direction d1.

According to the intelligent reflecting surface RE of the first embodiment configured as described above, the intelligent reflecting surface RE comprises the first substrate SUB1, the second substrate SUB2, the sealing material SE, the liquid crystal layer LC, and the transfer TM1. The common electrode CE is formed of metal. The common electrode CE corrodes when exposed to the atmosphere.

For this reason, the power receiving pad pB1 is electrically connected to the common electrode CE. The transfer TM1 is in contact with the power supply pad pA1 and the power receiving pad pB1. The power receiving pad pB1 is formed of a transparent conductive material. The uppermost layer of the power supply pad pA1, which is in contact with the transfer TM1, is formed of a transparent conductive material. The power supply pad pA1 and the power receiving pad pB1 are less likely to corrode even when exposed to the atmosphere. Therefore, the intelligent reflecting surface RE with a high product reliability can be obtained.

The common electrode CE is formed of metal and is a low-resistance member. For this reason, even if a high-resistance member such as the power receiving pad pB1 is mixed in the same electrical system as the common electrode CE, there is no adverse effect on the reflection characteristics of the intelligent reflecting surface RE.

Since the radio wave of 28 GHz range used in 5G have a strong straightness, the communication environment is deteriorated when a shield exists (coverage hole). For this reason, the reflected wave w2 can be used by arranging the intelligent reflecting surface RE as a measure. Since the intelligent reflecting surface RE can control the direction of the reflected wave w2, the intelligent reflecting surface RE can respond to changes in the radio wave environment.

Modified Example 1 of First Embodiment

Figure 9:
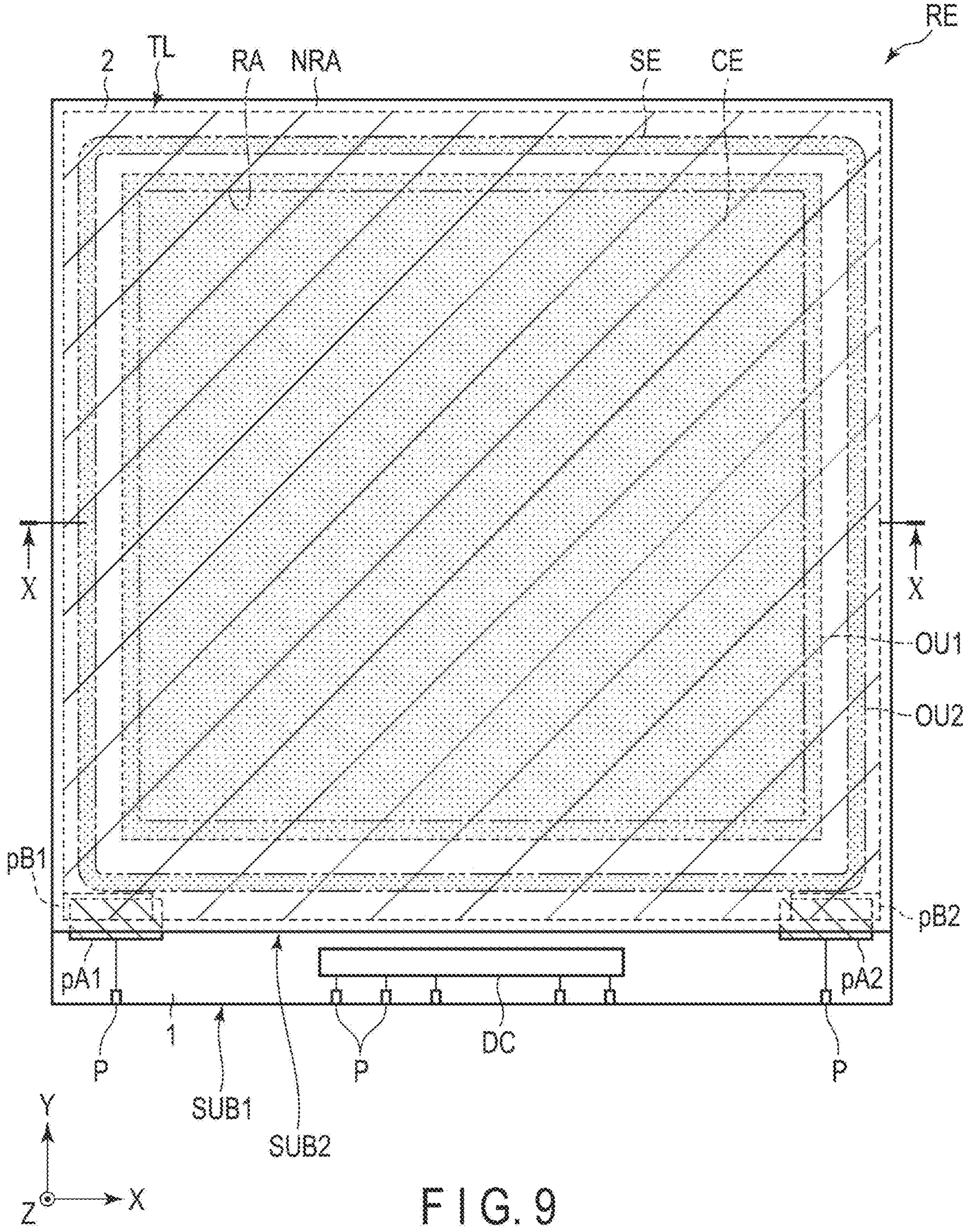
Figure 10:
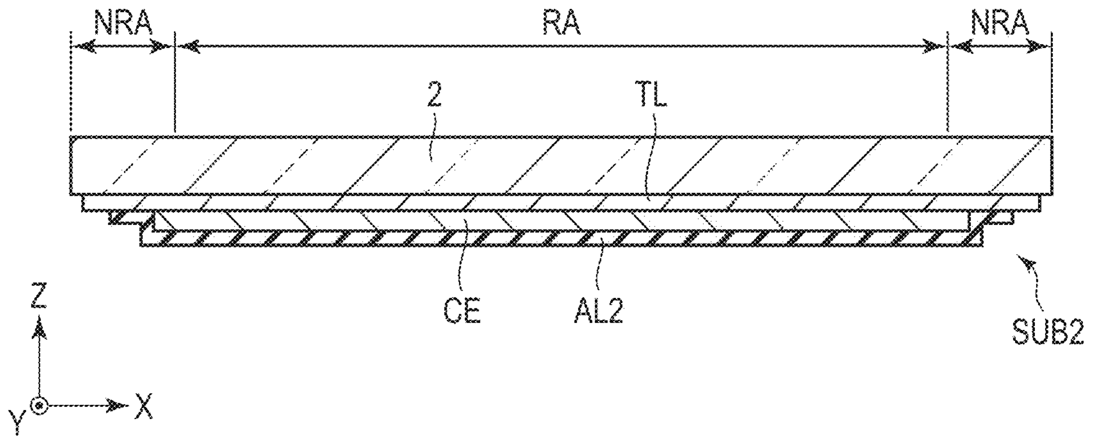
FIG. 10 is a cross-sectional view showing a second substrate of the intelligent reflecting surface along line X-X in FIG. 9.

Next, modified example 1 of the first embodiment will be described. The intelligent reflecting surface RE is constituted similarly to the above-described first embodiment except for constituent elements described in modified example 1. FIG. 9 is a plan view showing the intelligent reflecting surface RE according to modified example 1, illustrating the common electrode CE, the transparent conductive layer TL, the power supply pads pA1 and pA2, and the like. In the drawing, each of the common electrode CE and the sealing material SE is marked with a dot pattern, the transparent conductive layer TL is marked with a right-upward diagonal line, and the power supply pads pA1 and pA2 are marked with right-downward diagonal lines. FIG. 10 is a cross-sectional view showing the second substrate SUB2 of the intelligent reflecting surface RE along line X-X in FIG. 9.

As shown in FIG. 9, the transparent conductive layer TL is located in the reflective area RA and the non-reflective area NRA. For example, the transparent conductive layer TL is located over the entire reflective area RA. The transparent conductive layer TL includes the power receiving pads pB1 and pB2.

As shown in FIG. 9 and FIG. 10, the common electrode CE is formed without protruding portions CEa and CEb. The common electrode CE is in contact with the transparent conductive layer TL. Incidentally, the common electrode CE is not in contact with the power receiving pads pB1 and pB2 of the transparent conductive layer TL. The transparent conductive layer TL is located between the basement 2 and the common electrode CE in the direction parallel to the Z-axis.

The transparent conductive layer TL may be formed as described above. The same advantages as those of the above-described first embodiment can also be obtained in modified example 1.

Second Embodiment

Figure 11:
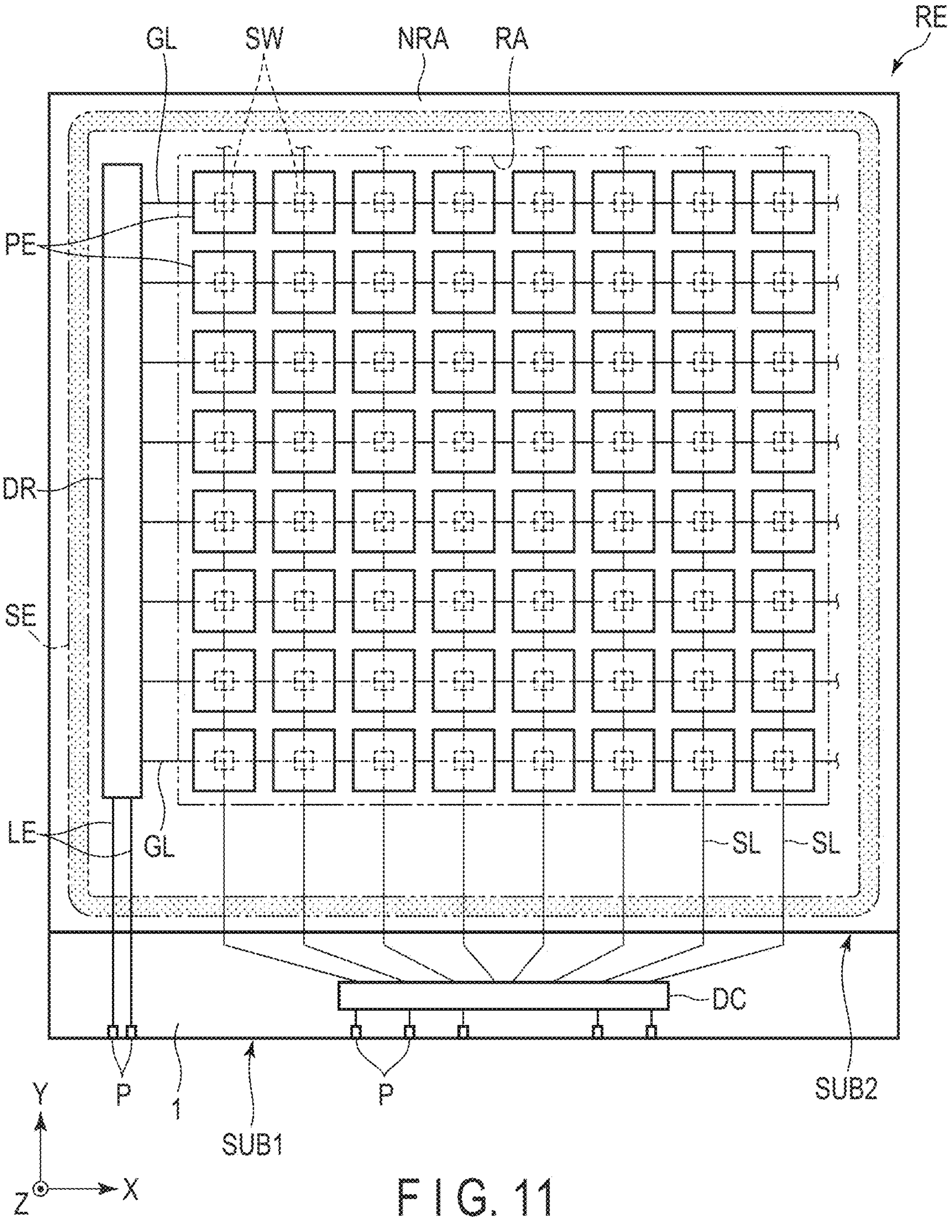
FIG. 11 is a plan view showing an intelligent reflecting surface according to a second embodiment.

Next, a second embodiment will be described. An intelligent reflecting surface RE is constituted similarly to the above-described first embodiment except for constituent elements described in the present embodiment. FIG. 11 is a plan view showing the intelligent reflecting surface RE according to the present embodiment. In the drawing, a dot pattern is attached to a sealing material SE.

As shown in FIG. 11, a first substrate SUB1 includes a plurality of signal lines SL, a plurality of control lines GL, a plurality of switching elements SW, a drive circuit DR, and a plurality of lead lines LE instead of connection lines L and wiring lines WL.

The plurality of signal lines SL extend along a Y-axis and are arranged in a direction along an X-axis. The signal lines SL are connected to a drive circuit DC. The plurality of control lines GL extend along the X-axis and are arranged in a direction along the Y-axis. The signal lines SL and the control lines GL extend in a reflective area RA and a non-reflective area NRA. The drive circuit DR is located in the non-reflective area NRA. The plurality of control lines GL are connected to the drive circuit DR.

The switching element SW is provided near an intersection of one signal line SL and one control line GL, and is electrically connected to one signal line SL and one control line GL. The plurality of lead lines LE are connected to the drive circuit DR on one side and to a pad p of OLB on the other side. The lead lines LE may be connected to the drive circuit DC.

Figure 12:
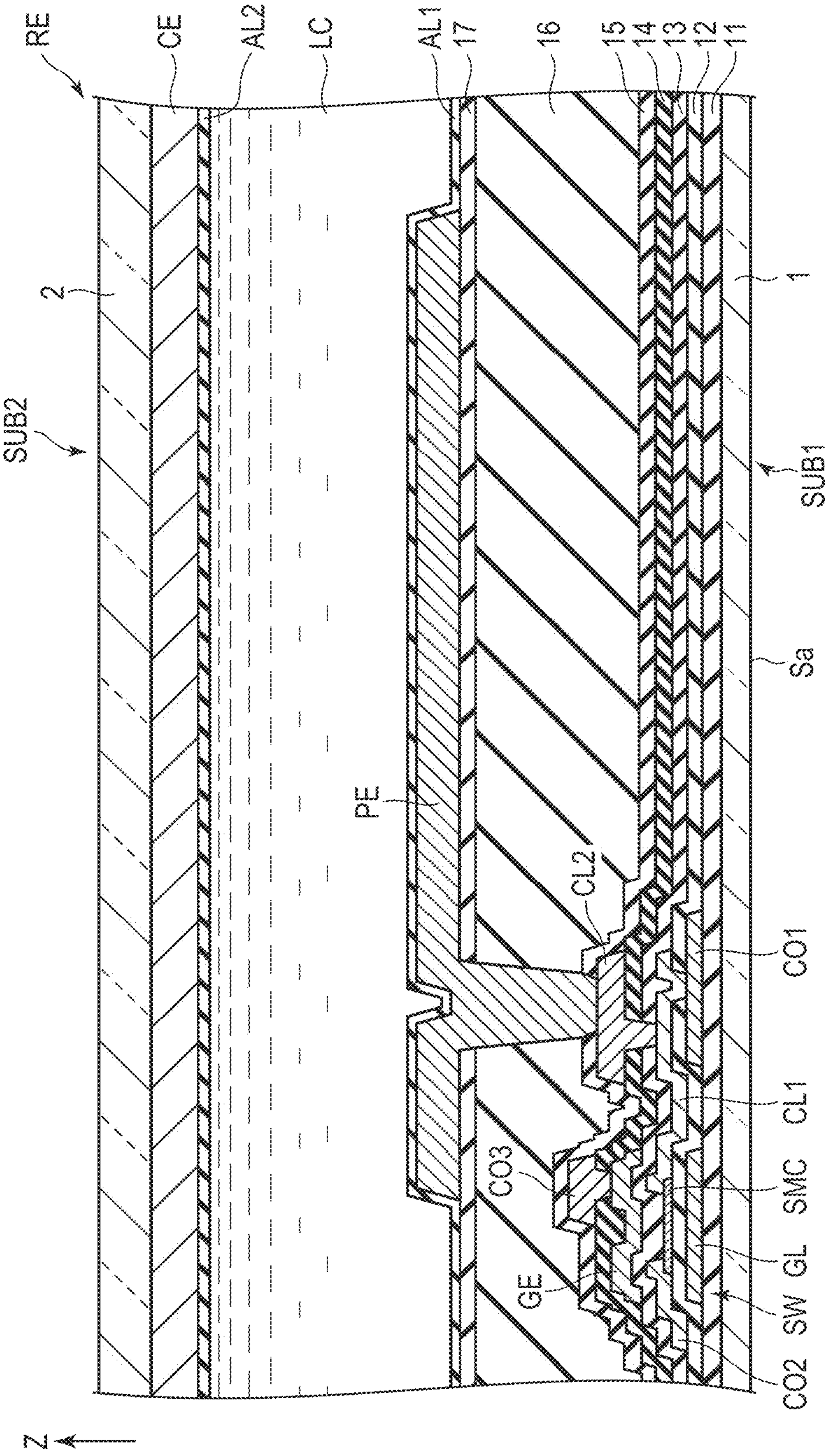
FIG. 12 is an enlarged cross-sectional view showing a part of the intelligent reflecting surface according to the second embodiment.

FIG. 12 is an enlarged cross-sectional view showing a part of the intelligent reflecting surface RE according to the present embodiment. As shown in FIG. 12, an insulating layer 11, an insulating layer 12, an insulating layer 13, an insulating layer 14, an insulating layer 15, an insulating layer 16, an insulating layer 17, and an alignment film AL1 are formed on a basement 1 in this order. Each of the insulating layers 11 to 17 is formed of an inorganic insulating layer or an organic insulating layer. In the present embodiment, the insulating layer 16 is an organic insulating layer and is formed of, for example, resin.

Each of the insulating layers 11 to 15 and 17 is an inorganic insulating layer. The insulating layer 11 is formed of silicon oxide (SiO). The insulating layer 12 includes a lower layer formed of SiN and an upper layer formed of SiO. The insulating layer 13 is formed of SiO. The insulating layer 14 is formed of SiN. The insulating layer 15 is formed of SiO or SiN. The insulating layer 17 is formed of SiN.

The control line GL and a conductive layer CO1 are provided on the insulating layer 11 and covered with the insulating layer 12. A semiconductor layer SMC is provided on the insulating layer 12. The semiconductor layer SMC is stacked on the control line GL. The semiconductor layer SMC is formed of an oxide semiconductor (OS), which is a transparent semiconductor. Typical examples of oxide semiconductors include, for example, indium gallium zinc oxide (InGaZnO), indium gallium oxide (InGaO), indium zinc oxide (InZnO), zinc tin oxide (ZnSnO), zinc oxide (ZnO), transparent amorphous oxide semiconductor (TAOS), and the like. However, the semiconductor layer SMC is not limited to an oxide semiconductor, and may be formed of low-temperature polycrystalline silicon as amorphous silicon or polycrystalline silicon.

A conductive layer CO2 and a connection line layer CL1 are provided on the insulating layer 12 and the semiconductor layer SMC and covered with the insulating layer 13. The connection line layer CL1 is in contact with the conductive layer CO1 through a contact hole formed in the insulating layer 12. The conductive layer CO2 and the connection line layer CL1 are in contact with and electrically connected to the semiconductor layer SMC. One of an area of the semiconductor layer SMC to which the conductive layer CO2 is connected and an area to which the connection line layer CL1 is connected, is a source area, and the other is a drain area. Then, the semiconductor layer SMC includes a channel area between a source area and a drain area.

A gate electrode GE is provided on the insulating layer 13 and covered with the insulating layer 14. The gate electrode GE is electrically connected to the control line GL. The gate electrode GE overlaps with at least the channel area of the semiconductor layer SMC. The control line GL, the semiconductor layer SMC, the gate electrode GE, and the like constitute the switching element SW as a thin film transistor (TFT).

An area of the control line GL, which overlaps with the semiconductor layer SMC, functions as a gate electrode. For this reason, the switching element SW is a dual-gate TFT. However, the switching element SW may be a bottom-gate TFT or a top-gate TFT.

A conductive layer CO3 and the connection line layer CL2 are provided on the insulating layer 14 and covered with the insulating layer 15. The conductive layer CO3 is in contact with the gate electrode GE through a contact hole formed in the insulating layer 14. The connection line layer CL2 is in contact with the connection line layer CL1 through a contact hole formed in the insulating layers 13 and 14.

The insulating layer 16 and the insulating layer 17 are provided on the insulating layer 15 in this order. A patch electrode PE is provided on the insulating layer 17 and covered with the alignment film AL1. The patch electrode PE is in contact with the connection line layer CL2 through a contact hole formed in the insulating layers 15, 16, and 17.

A common electrode CE and an alignment film AL2 are provided in this order on a surface of a basement 2, which is opposed to the first substrate SUB1.

The control line GL, the conductive layers CO1, CO2, and CO3, the connection line layers CL1 and CL2, and the gate electrode GE are formed of metal as a low-resistance conductive material. The control line GL and the gate electrode GE may be formed of molybdenum (Mo), tungsten (W), or an alloy thereof. The connection line layers CL1 and CL2 may be formed of TAT or MAM.

As shown in FIG. 11 and FIG. 12, the plurality of patch electrodes PE can be individually driven by active matrix driving. For this reason, the plurality of patch electrodes PE can be driven independently. For example, the direction of the reflected wave w2 reflected on the intelligent reflecting surface RE can be made parallel to the Y-Z plane.

Alternatively, the direction of the reflected wave w2 reflected on the intelligent reflecting surface RE can be used as a direction parallel to a third plane other than the X-Z plane and the Y-Z plane. Incidentally, the third plane is a plane defined by the Z-axis and a third axis other than the X-axis and the Y-axis in the X-Y plane.

According to the intelligent reflecting surface RE of the second embodiment configured as described above, the same advantages as those of the first embodiment can be obtained. Since each of the patch electrodes PE can be driven independently, the degree of freedom of a reflection direction d of a reflected wave w2 that the intelligent reflecting surface RE reflects can be increased.

Third Embodiment

Figure 13:
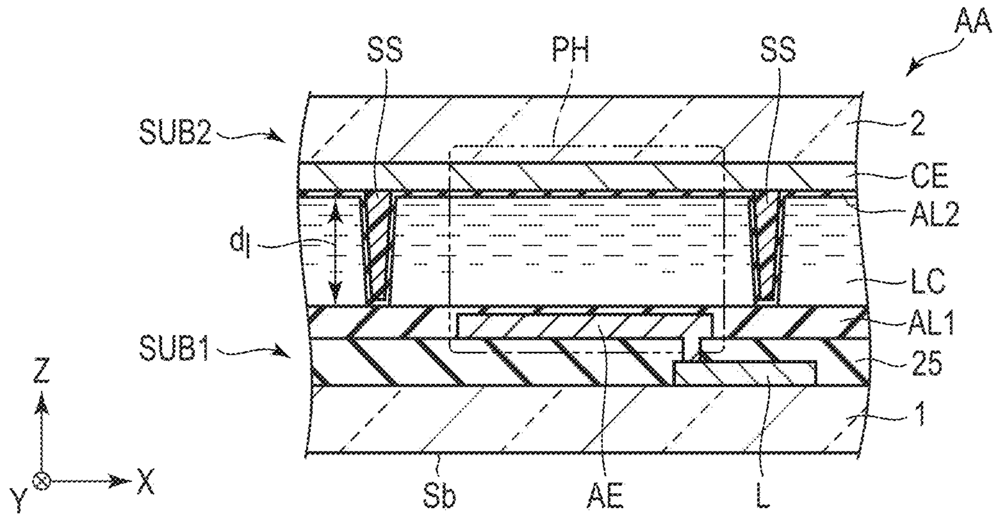
FIG. 13 is an enlarged cross-sectional view showing a part of a phased array antenna according to a third embodiment.

Next, a third embodiment will be described. In the present embodiment, a phased array antenna AA will be described. The techniques relating to the common electrode CE, the transparent conductive layer TL (power receiving pad pB), the transfer TM, and the power supply pad pA described in the above embodiments and modified embodiment are also applicable to a phased array antenna AA. FIG. 13 is an enlarged cross-sectional view showing a part of the phased array antenna AA according to the third embodiment. The phased array antenna AA is a device that is capable of emitting a radio wave to the outside from an antenna element by a high-frequency signal reaching the antenna element and of changing the direction of the radio wave.

As shown in FIG. 13, the phased array antenna AA comprises a first substrate SUB1, a second substrate SUB2, and a liquid crystal layer LC. The first substrate SUB1 includes an electrically insulating basement 1, a plurality of connection lines L, an insulating layer 25, a plurality of phase control electrodes AE, and an alignment film AL1.

The basement 1 is formed in a flat plate shape and extends along an X-Y plane including an X-axis and a Y-axis that are orthogonal to each other. The connection lines L are provided on the basement 1. The insulating layer 25 is formed on the basement 1 and the connection lines L. The phase control electrodes AE are provided on the insulating layer 25. The phase control electrodes AE are connected to the connection lines L through contact holes formed in the insulating layer 25. The alignment film AL1 is formed on the insulating layer 25 and the phase control electrodes AE to cover the phase control electrodes AE.

The second substrate SUB2 is opposed to and spaced from the first substrate SUB1 with a predetermined gap. The second substrate SUB2 includes an electrically insulating basement 2, a common electrode CE, and an alignment film AL2. The basement 2 is formed in a flat plate shape and extends along the X-Y plane. The common electrode CE is opposed to the plurality of phase control electrodes AE in a direction parallel to the Z-axis orthogonal to each of the X-axis and the Y-axis. The alignment film AL2 covers the common electrode CE.

The liquid crystal layer LC is held between the first substrate SUB1 and the second substrate SUB2. The liquid crystal layer LC is opposed to the plurality of phase control electrodes AE on one side and opposed to the common electrode CE on the other side.

A thickness (cell gap) of the liquid crystal layer LC is referred to as $d_1$. In the present embodiment, the thickness $d_1$ is 50 μm. However, the thickness $d_1$ is not particularly limited, but is determined by optimizing the size of the phase control electrodes AE. The thickness $d_1$ may be less than 50 μm as long as the phase of the high-frequency signal propagating through the phase control electrodes AE can be adjusted sufficiently. Alternatively, the thickness $d_1$ may exceed 50 μm. The high-frequency signal will be described later.

A common voltage is applied to the common electrode CE, and the potential of the common electrode CE is fixed. In the present embodiment, the common voltage is 0 V. Voltages are also applied to the phase control electrodes AE through the connection lines L. In the present embodiment, the phase control electrodes AE are AC-driven. The liquid crystal layer LC is driven by a so-called longitudinal electric field. A voltage applied between the phase control electrodes AE and the common electrode CE acts on the liquid crystal layer LC, thereby changing the dielectric constant of the liquid crystal layer LC.

When the dielectric constant of the liquid crystal layer LC changes, the propagation speed of the high-frequency signal in the liquid crystal layer LC also changes. For this reason, the phase of the high-frequency signal can be adjusted by adjusting the voltage acting on the liquid crystal layer LC. As a result, the direction of emission of the radio waves can be adjusted. In the present embodiment, an absolute value of the voltage applied to the liquid crystal layer LC is 10 V or less. This is because the dielectric constant of the liquid crystal layer LC is saturated at 10 V. However, the absolute value of the voltage applied to the liquid crystal layer LC may exceed 10 V.

The first substrate SUB1 has an emission surface Sb emitting the radio wave to a side opposite to the side opposed to the second substrate SUB2.

The thickness $d_1$ (cell gap) of the liquid crystal layer LC is held by a plurality of spacers SS. In the present embodiment, the spacers SS are columnar spacers, formed in the second substrate SUB2, and protruding toward the first substrate SUB1 side.

The width of the spacer SS is 10 to 20 μm. The spacers SS do not exist in an area opposed to the phase control electrodes AE. However, the spacers SS may exist in the area. Incidentally, the spacers SS may be formed in the first substrate SUB1 to protrude toward the second substrate SUB2 side. Alternatively, the spacers SS may be spherical spacers.

The phased array antenna AA comprises a plurality of phase shifters PH. Each of the phase shifters PH includes a phase control electrode AE of the plurality of phase control electrodes AE, a portion of the common electrode CE, which is opposed to the phase control electrode AE, and an area of the liquid crystal layer LC, which is opposed to the phase control electrode AE. Each of the phase shifters PH functions to adjust the phase of the high-frequency signal propagating through the phase control electrode AE in accordance with the voltage applied to the phase control electrode AE.

Figure 14:
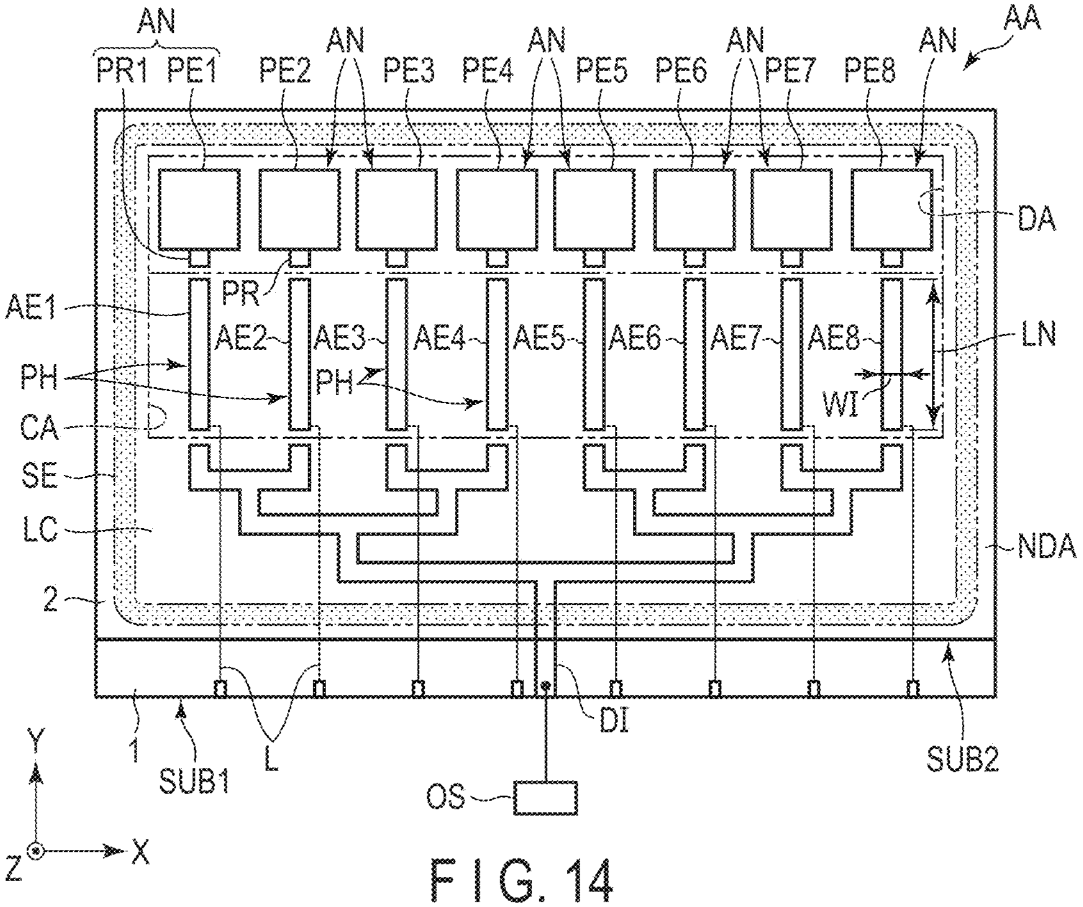
FIG. 14 is a plan view showing the phased array antenna.

FIG. 14 is a plan view showing the phased array antenna AA. As shown in FIG. 14, each of the basements 1 and 2 is located in an emission area DA, a phase control area CA, and a non-emission area NDA. The phase control area CA is an area adjacent to the emission area DA. The non-emission area NDA is an area outside the emission area DA and the phase control area CA.

The first substrate SUB1 and the second substrate SUB2 are joined by sealing materials SE arranged on their respective peripheral edges. The sealing materials SE surround at least the phase control area CA. In the present embodiment, the sealing materials SE are located in the non-emission area NDA and surround the emission area DA and the phase control area CA. The liquid crystal layer LC is held between the first substrate SUB1 and the second substrate SUB2. The liquid crystal layer LC is provided in a space surrounded by the first substrate SUB1, the second substrate SUB2, and the sealing materials SE.

The plurality of phase control electrodes AE are located in the phase control area CA. The plurality of phase control electrodes AE extend in a direction along the Y-axis and are arranged along the X-axis. The plurality of phase control electrodes AE are electrically independent of each other. The connection lines L extend to an area of the basement 1, which is not opposed to the second substrate SUB2.

The first substrate SUB1 comprises a distributor DI and a plurality of antenna elements AN in addition to the plurality of connection lines L and the plurality of phase control electrodes AE. In the present embodiment, the distributor DI is a conductive line which branches and extends a plurality of times, and is formed of a metal or a conductor equivalent to a metal. The distributor DI extends to an area of the basement 1, which is not opposed to the second substrate SUB2. The distributor DI may be connected to a pad of OLB, which is not illustrated. The distributor DI is connected to an oscillator OS outside the phased array antenna AA.

The oscillator OS outputs a high-frequency signal in a frequency band of a microwave or a millimeter-wave to the distributor DI. The distributor DI transmits the high-frequency signal to the plurality of phase control electrodes AE (plurality of phase shifters PH) under the same conditions. Each of the phase control electrodes AE is arranged to be spaced from the distributor DI in an insulation distance of several μm. The high-frequency signal passes between the distributor DI and the phase control electrode AE, and is input to the phase control electrode AE.

Each of the antenna elements AN includes a patch electrode PE serving as an antenna, and a protruding portion PR. The patch electrode PE is located in the emission area DA. In the present embodiment, the protruding portion PR is also located in the emission area DA.

The plurality of patch electrodes PE are arranged at intervals along the X-axis. In other words, the plurality of patch electrodes PE are arranged one-dimensionally. In a case where the plurality of patch electrodes PE are arranged one-dimensionally, driving the plurality of patch electrodes PE can improve the directionality of the phase.

In the present embodiment, the plurality of patch electrodes PE are arranged at regular intervals in a direction along the X-axis. In the X-Y plane, the plurality of patch electrodes PE have the same shape and the same size. In the present embodiment, the patch electrode PE has a square shape. In the patch electrode PE, a length in a direction along the X-axis and a length in a direction along the Y-axis are several mm. However, the size (above-described length) of the patch electrode PE is not particularly limited. In addition, the shape of the patch electrode PE is not particularly limited, and may be a circle such as a perfect circle, a quadrangle other than a square, and the like.

The plurality of patch electrodes PE include a first patch electrode PE1 to an eighth patch electrode PE8. For example, the second patch electrode PE2 (second antenna) is located between the first patch electrode PE1 (first antenna) and the third patch electrode PE3 (third antenna), in the direction along the X-axis.

In FIG. 14, an example is illustrated in which eight patch electrodes PE are arranged in the direction along the X-axis. However, the number of patch electrodes PE can be variously modified. For example, one hundred patch electrodes PE may be arranged in the direction along the X-axis. Detailed descriptions will be omitted, but the plurality of patch electrodes PE may be arrayed in a matrix in the direction along the X-axis and the direction along the Y-axis. Even in such a case, the plurality of patch electrodes PE (antennas) correspond to the plurality of phase control electrodes AE on a one-to-one basis.

Each of the patch electrodes PE (antennas) emits the radio wave, based on the high-frequency signal transmitted from the corresponding phase control electrode AE.

The protruding portion PR is connected to the patch electrode PE. In the present embodiment, the protruding portion PR is formed integrally with the patch electrode PE. The protruding portion PR protrudes toward the corresponding phase control electrode AE from the patch electrode PE. The protruding portion PR has a quadrangular shape. Each protruding portion PR (antenna element AN) is arranged to be spaced from the phase control electrode AE in an insulating distance of several μm. A plurality of protruding portions PR of the first substrate SUB1 include, for example, a first protruding portion PR1 connected to the first patch electrode PE1.

A gap between the phase control electrode AE and the antenna element AN, and the shapes of both the members sandwiching the above gap are not particularly limited. However, the shape of each of the phase control electrode AE and the antenna element AN may be determined such that output impedance on the phase control electrode AE side and input impedance on the antenna element AN side match to cause no reflection of the high-frequency signal between the phase control electrode AE and the antenna element AN. For example, the antenna element AN may be formed without the protruding portion PR.

Each of the phase control electrodes AE comprises a function of adjusting the phase of the high-frequency signal to be input from the distributor DI and transmitting the high-frequency signal having the adjusted phase to one corresponding patch electrode PE among the plurality of patch electrodes PE (plurality of antennas). The plurality of phase control electrodes AE include a first phase control electrode AE1 to an eighth phase control electrode AE8 corresponding to the first patch electrode PE1 to the eighth patch electrode PE8. For example, the first phase control electrode AE1 transmits the high-frequency signal to the first patch electrode PE1, the second phase control electrode AE2 transmits the high-frequency signal to the second patch electrode PE2, and the third phase control electrode AE3 transmits the high-frequency signal to the third patch electrode PE3.

For example, a gap between the first phase control electrode AE1 and the first protrusion PR1 is several μm, while an interval between the first phase control electrode AE1 and the second phase control electrode AE2 is several mm. For this reason, the high-frequency signal input to the first phase control electrode AE1 passes between the first phase control electrode AE1 and the first protrusion PR1 and is input to the first protrusion PR1, but does not leak to the second phase control electrode AE2.

The size of the phase shifter PH (phase control electrode AE) will be described. On the X-Y plane, the plurality of phase control electrode AE have the same shape and the same size. In the present embodiment, the phase control electrode AE has a rectangular shape having a long axis along the Y-axis. The phase control electrode AE has a width WI in the direction along the X-axis and a length LN in the direction along the Y-axis. In the present embodiment, WI=100 μm, and LN=60 mm.

When the dielectric constant of is changed from e1 to e2 by applying a bias voltage to the liquid crystal layer LC, an amount of phase change of the high-frequency signal is $(e2^{0.5}-e1^{0.5})\cdot LN/\lambda$. In the present embodiment, the phase change can be controlled from 0 to 360° by the bias voltage applied to the liquid crystal layer LC. The maximum amount of phase change of the high-frequency signal, which is caused by the phase shifter PH, is 360°. For this reason, when the size of the phase control electrode AE in the X-Y plane is changed to 100 μm×30 mm of a half, the maximum amount of phase change of the high-frequency signal, which is caused by the phase shifter PH, is 180°.

In the phased array antenna AA, the direction of the radio wave (high-frequency wave) to be emitted is changed by setting a difference in the amount of phase change between the adjacent phase shifters PH, but the amount of phase change needs to be fully used up to 360° in order to chronologically change the bias voltage with respect to the liquid crystal layer LC. From the above-described viewpoint, the size of the phase shifter PH (phase control electrode AE) is determined.

Based on the above, the phased array antenna AA is configured such that the maximum phase difference of 360° can be applied between the high-frequency signal that is transmitted to the patch electrode PE by one phase shifter PH and the high-frequency signal that is transmitted to the patch electrode PE by another phase shifter PH. For this reason, the phased array antenna AA is configured such that the maximum phase difference of 360° can be applied between the radio wave emitted from one patch electrode PE and the radio wave emitted from another patch electrode PE.

The connection lines L, the phase control electrodes AE, the patch electrodes PE, the protruding portions PR, and the above-described common electrode CE are formed of a metal or a conductor equivalent to a metal.

The liquid crystal layer LC may be provided in at least an area opposed to all of the phase control electrodes AE. In the present embodiment, the sealing material SE is arranged on the peripheral edge of each of the first substrate SUB1 and the second substrate SUB2 as described above. For this reason, the liquid crystal layer LC may be opposed to the plurality of antenna elements AN, the distributor DI, and the plurality of connection lines L.

The common electrode CE is located in at least the phase control area CA. The common electrode CE is opposed to the plurality of phase control electrodes AE in the direction parallel to the Z-axis.

The connection line L is a fine wire having a width of several μm, and the area of the connection line L in the X-Y plane is sufficiently smaller than the area of the phase control electrode AE. Accordingly, the connection line L can be made difficult to function as the phase shifter PH.

In a case where the phased array antenna AA emits the radio wave in any emission direction, the phase amount of the high-frequency signal that is adjusted (delayed) by the phase shifter PH can be estimated from the above description with reference to FIG. 7, and its detailed description will be omitted.

Figure 15:
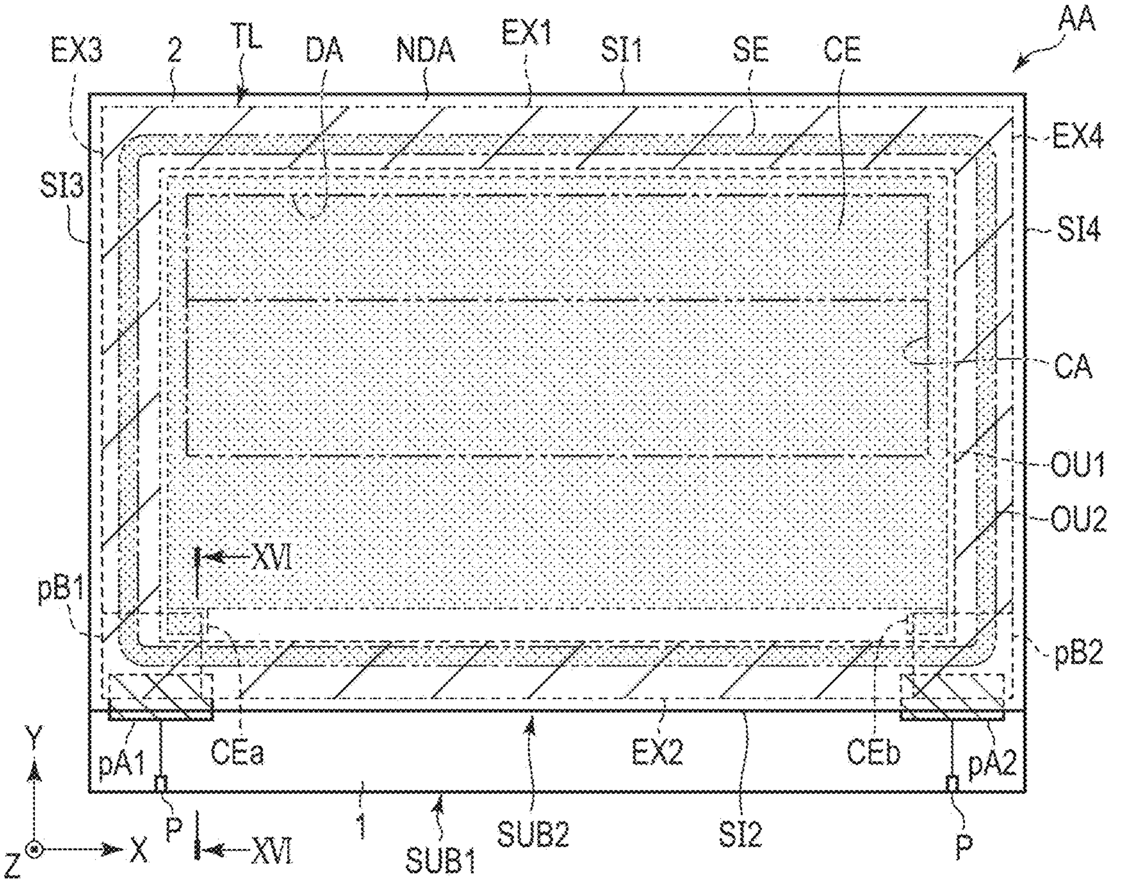

FIG. 15 is a plan view showing the phased array antenna AA, illustrating the common electrode CE, the transparent conductive layer TL, the power supply pads pA1 and pA2, and the like. In the drawing, each of the common electrode CE and the sealing material SE is marked with a dot pattern, the transparent conductive layer TL is marked with a right-upward diagonal line, and the power supply pads pA1 and pA2 are marked with right-downward diagonal lines.

As shown in FIG. 15, the first substrate SUB1 includes power supply pads pA1 and pA2. The power supply pads pA1 and pA2 are located in the non-emission area NDA and opposed to the second substrate SUB2. The power supply pads pA1 and pA2 are connected to the pads p of the OLB, respectively.

The second substrate SUB2 includes the basement 2, the common electrode CE, and the transparent conductive layer TL. The common electrode CE may be located at least in the phase control area CA. In the present embodiment, the common electrode CE is opposed to all of the phase control electrodes AE, and also opposed to the antenna elements AN, the distributor DI, and the connection lines L. For this reason, the common electrode CE is located in the emission area DA, the phase control area CA, and the non-emission area NDA. However, the common electrode CE may not be opposed to the antenna elements AN, the distributor DI, and the connection lines L.

The transparent conductive layer TL is formed of a transparent conductive material such as ITO. In the present embodiment, the transparent conductive layer TL is located in the non-emission area NDA. In addition, the transparent conductive layer TL includes an extending portion EX, a power receiving pad pB1 serving as a first power receiving pad, and a power receiving pad pB2 serving as a second power receiving pad.

The extending portion EX is provided to be spaced from the common electrode CE in plan view. The extending portion EX includes a first extending portion EX1, a second extending portion EX2, a third extending portion EX3, and a fourth extending portion EX4. The first extending portion EX1 is located between the common electrode CE and an upper side SI1 of the basement 2 and extends along the X-axis. The second extending portion EX2 is located between the common electrode CE and a lower side SI2 of the basement 2 and extends along the X-axis. The third extending portion EX3 is located between the common electrode CE and a left side SI3 of the basement 2, is provided continuously from the first extending portion EX1, and extends along the Y-axis. The fourth extending portion EX4 is located between the common electrode CE and a right side SI4 of the basement 2, is provided continuously from the first extending portion EX1, and extends along the Y-axis.

The power receiving pad pB1 is located in the non-emission area NDA and is provided continuously from each of the second extending portion EX2 and the third extending portion EX3. The power receiving pad pB1 overlaps with each of the power supply pad pA1 and a protruding portion CEa of the common electrode CE in a direction parallel to the Z-axis. The protruding portion CEa is located between the phase control area CA and the lower side SI2.

The power receiving pad pB2 is located in the non-emission area NDA and is provided continuously from each of the second extending portion EX2 and the fourth extending portion EX4. The power receiving pad pB2 overlaps with each of the power supply pad pA2 and a protruding portion CEb of the common electrode CE in the direction parallel to the Z-axis. The protruding portion CEb is located between the phase control area CA and the lower side SI2.

As described above, the first extending portion EX1, the second extending portion EX2, the third extending portion EX3, the fourth extending portion EX4, the power receiving pad pB1, and the power receiving pad pB2 are integrally formed to constitute a transparent conductive the layer TL.

In plan view, an outer periphery OU1 of the common electrode CE is located on a side closer to the phase control area CA than an outer periphery OU2 of the sealing material SE. The sealing material SE, the basement 1, the basement 2, and the like protect the common electrode CE against air (moisture). Therefore, corrosion of the common electrode CE can be suppressed.

Figure 16:
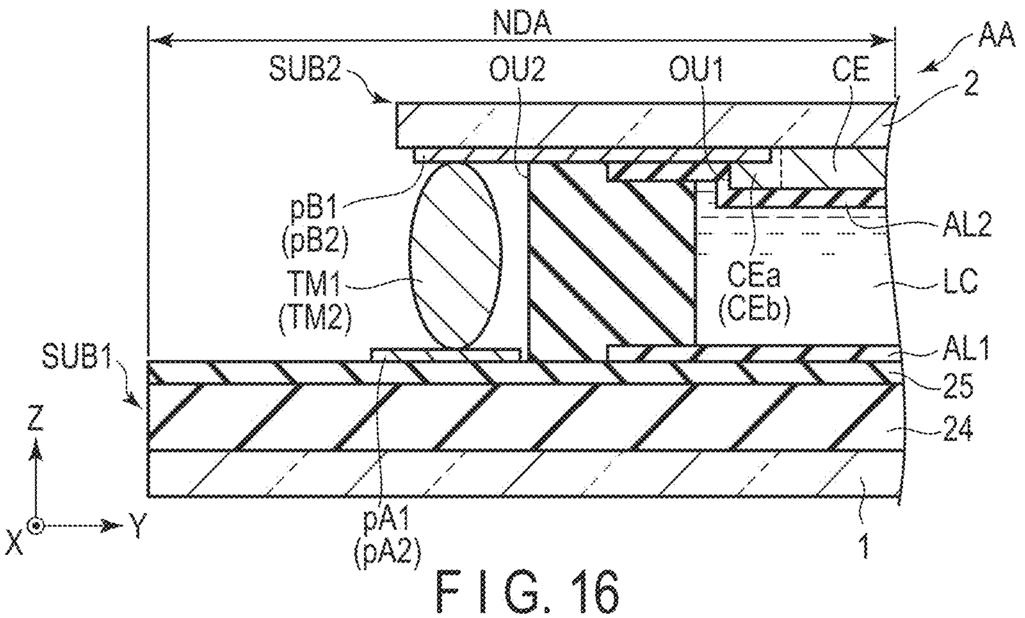
FIG. 16 is a cross-sectional view showing the phased array antenna along line XVI-XVI in FIG. 15.

FIG. 16 is a cross-sectional view showing the phased array antenna AA along line XVI-XVI in FIG. 15.

As shown in FIG. 16, the first substrate SUB1 includes the basement 1, an insulating layer 24, an insulating layer 25, the power supply pad pA1, the alignment film AL1, and the like. The insulating layer 24 is formed above the basement 1. An insulating layer or the like (not shown) may be interposed between the basement 1 and the insulating layer 24.

The insulating layer 25 is formed on the insulating layer 16. The power supply pad pA1 and the alignment film AL1 are formed on the insulating layer 25. Each of the insulating layers 24 and 25 is formed of an inorganic insulating layer or an organic insulating layer.

The power receiving pad pB1 is electrically connected to the common electrode CE. The common electrode CE is in contact with the power receiving pad pB1 in the non-reflective area NRA. More specifically, the common electrode CE is in contact with the power receiving pad pB1 in an area on a side closer to the phase control area CA than the sealing material SE.

The common electrode CE is formed of metal, for example, TAT or MAM.

In the direction parallel to the Z-axis, the thickness of the power receiving pad pB1 is the same as the thickness T1 shown in FIG. 4, and the thickness of the common electrode CE is the same as the thickness T2 shown in FIG. 4. In addition, the present embodiment also provides a phased array antenna AA in which the common electrode CE is resistant to corrosion.

In the non-reflective area NRA, the power receiving pad pB1 is located between the basement 2 and the common electrode CE in the direction parallel to the Z-axis. In the process of manufacturing the second substrate SUB2, the common electrode CE is formed after the power receiving pad pB1 is formed. Therefore, corrosion of the common electrode CE can be suppressed.

The phased array antenna AA further comprises a transfer TM1. The transfer TM1 is located outside the sealing material SE. In other words, the sealing material SE is located between the transfer TM1 and the common electrode CE. From the viewpoint of product reliability, the transfer TM1 is arranged so as not to be in contact with the liquid crystal layer LC.

The transfer TM1 is in contact with the power supply pad pA1 and the power receiving pad pB1. Therefore, the power supply pad pA1 can apply a voltage (common voltage) to the power receiving pad pB1 via the transfer TM1.

The power receiving pad pB1 is formed of a transparent conductive material. The uppermost layer of the power supply pad pA1, which is in contact with the transfer TM1, is formed of a transparent conductive material. Therefore, corrosion of the power supply pad pA1 and the power receiving pad pB1 can be suppressed.

The power supply pad pA1 may have a single-layer structure composed of a transparent conductive layer but may have a stacked structure including a metal layer and a transparent conductive layer.

In addition, the uppermost layer of the power supply pad pA1 and the power receiving pad pB1 may be formed of a material which is less likely to corrode than Al.

The relationship among the power supply pad pA1, the power receiving pad pB1, the transfer TM1, the protruding portion CEa, and the like has been focused in FIG. 16, but the relationship among the power supply pad pA2, the power receiving pad pB2, the transfer TM2 serving as the second transfer, the protruding portion CEb, and the like has also been focused.

According to the phased array antenna AA of the third embodiment configured as described above, the phased array antenna AA comprises the first substrate SUB1, the second substrate SUB2, the sealing material SE, the liquid crystal layer LC, and the transfer TM1. The power receiving pad pB1 is formed of a transparent conductive material. The uppermost layer of the power supply pad pA1, which is in contact with the transfer TM1, is formed of a transparent conductive material. The power supply pad pA1 and the power receiving pad pB1 are less likely to corrode. Therefore, a phased array antenna AA with a high product reliability can be obtained.

The common electrode CE is formed of metal and is a low-resistance member. For this reason, even if a high-resistance member such as the power receiving pad pB1 is mixed in the same electrical system as the common electrode CE, there is no adverse effect on the emission characteristics of the phased array antenna AA.

Modified Example 1 of Third Embodiment

Next, modified example 1 of the third embodiment will be described. The phased array antenna AA is constituted similarly to the above-described third embodiment except for constituent elements described in modified example 1.

Figure 17:
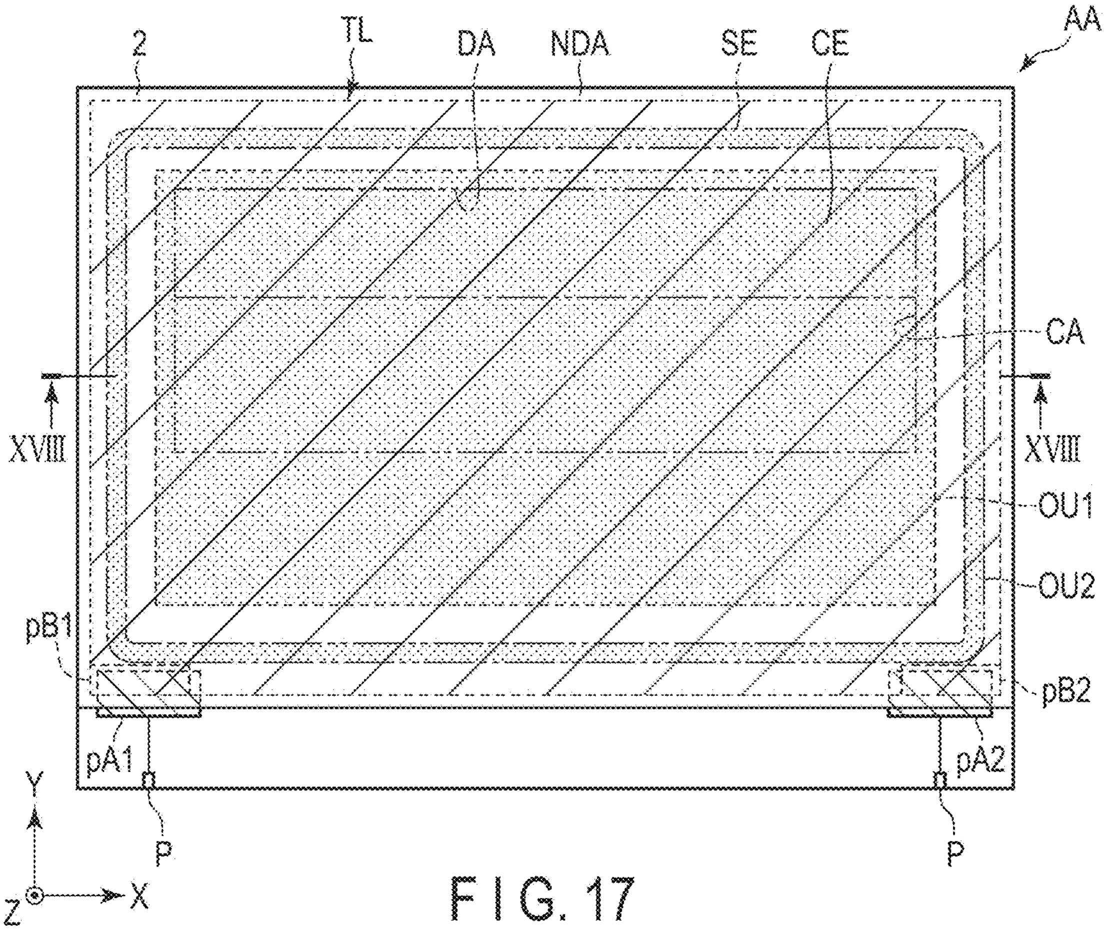
Figure 18:
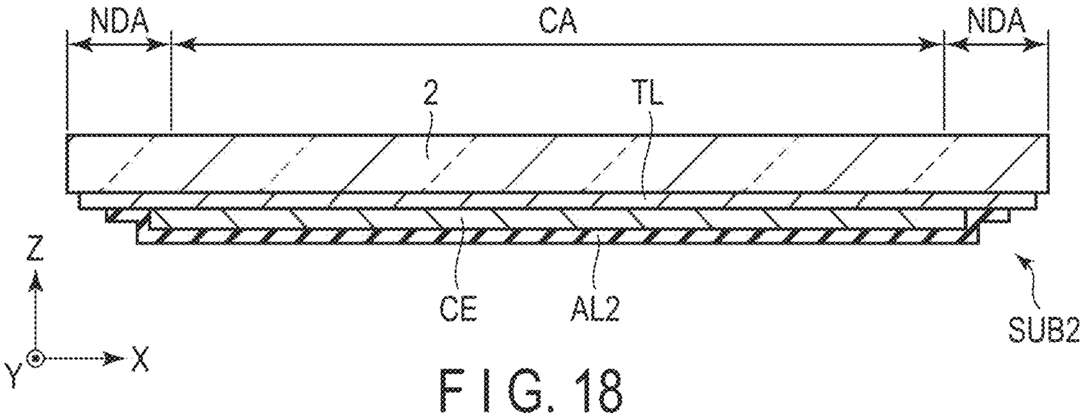
FIG. 18 is a cross-sectional view showing a second substrate of the phased array antenna along line XVIII-XVIII in FIG. 17.

FIG. 17 is a plan view showing the phased array antenna AA according to modified example 1, illustrating the common electrode CE, the transparent conductive layer TL, the power supply pads pA1 and pA2, and the like. In the drawing, each of the common electrode CE and the sealing material SE is marked with a dot pattern, the transparent conductive layer TL is marked with a right-upward diagonal line, and the power supply pads pA1 and pA2 are marked with right-downward diagonal lines. FIG. 18 is a cross-sectional view showing the second substrate SUB2 of the phased array antenna AA along line XVIII-XVIII in FIG. 17.

As shown in FIG. 17, the transparent conductive layer TL is located in the emission area DA, the phase control area CA, and the non-emission area NDA. For example, the transparent conductive layer TL is located over the entire phase control area CA. The transparent conductive layer TL includes the power receiving pads pB1 and pB2.

As shown in FIG. 17 and FIG. 18, the common electrode CE is formed without protruding portions CEa and CEb. The common electrode CE is in contact with the transparent conductive layer TL. Incidentally, the common electrode CE is not in contact with the power receiving pads pB1 and pB2 of the transparent conductive layer TL. The transparent conductive layer TL is located between the basement 2 and the common electrode CE in the direction parallel to the Z-axis.

The transparent conductive layer TL may be formed as described above. The same advantages as those of the above-described third embodiment can also be obtained in modified example 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the second substrate SUB2 may comprise the power receiving pads pB1 and pB2 of the transparent conductive layer TL. Therefore, the second substrate SUB2 may comprise the extending portion EX as required.

What is claimed is:

1. An intelligent reflecting surface comprising:

a first substrate including a plurality of patch electrodes located in a first area, spaced apart along each of an X-axis and a Y-axis orthogonal to each other, and arrayed in a matrix, and a first power supply pad located in a second area outside the first area;

a second substrate including a common electrode located in the first area and opposed to the plurality of patch electrodes in a direction parallel to a Z-axis orthogonal to each of the X-axis and the Y-axis, and a first power receiving pad located in the second area, electrically connected to the common electrode, and overlapped with the first power supply pad in the direction parallel to the Z-axis;

a sealing material located in the second area to bond the first substrate to the second substrate;

a liquid crystal layer held between the first substrate and the second substrate and surrounded by the sealing material; and a first transfer that is in contact with the first power supply pad and the first power receiving pad, wherein an uppermost layer of the first power supply pad, which is in contact with the first transfer, is formed of a transparent conductive material, the first power receiving pad is formed of a transparent conductive material, and the common electrode is formed of metal.

2. The intelligent reflecting surface according to claim 1, wherein an intensity of a reflected wave for a radio wave made incident on the second area as a reflected surface is smaller than an intensity of a reflected wave for a radio wave made incident on the first area as a reflected surface.

3. The intelligent reflecting surface according to claim 1, wherein an outer periphery of the common electrode is located on a side closer to the first area than an outer periphery of the sealing material, in plan view.

4. The intelligent reflecting surface according to claim 1, wherein the second substrate further includes an electrically insulating basement located in the first area and the second area, the common electrode extends in the second area and is in contact with the first power receiving pad in the second area, and the first power receiving pad is located between the basement and the common electrode in a direction parallel to the Z-axis, in the second area.

5. The intelligent reflecting surface according to claim 1, wherein the second substrate further includes a transparent conductive layer located in the second area and formed of a transparent conductive material, and the transparent conductive layer includes an extending portion provided to be spaced from the common electrode in plan view, and the first power receiving pad overlapped with the common electrode in plan view and formed integrally with the extending portion.

6. The intelligent reflecting surface according to claim 1, wherein the second substrate further includes an electrically insulating basement located in the first area and the second area, and a transparent conductive layer located in the first area and the second area and formed of a transparent conductive material, the common electrode is in contact with the transparent conductive layer, and the transparent conductive layer includes the first power receiving pad and is located between the basement and the common electrode in a direction parallel to the Z-axis.

7. The intelligent reflecting surface according to claim 1, further comprising:

a second transfer, wherein the first substrate further includes a second power supply pad located in the second area, the second substrate further includes a second power receiving pad located in the second area, electrically connected to the common electrode, and overlapped with the second power supply pad in a direction parallel to the Z-axis, the second transfer is in contact with the second power supply pad and the second power receiving pad, an uppermost layer of the second power supply pad, which is in contact with the second transfer, is formed of a transparent conductive material, and the second power receiving pad is formed of a transparent conductive material.

8. The intelligent reflecting surface according to claim 1, wherein each of reflection controllers includes a patch electrode among the plurality of patch electrodes, a portion of the common electrode, which is opposed to the patch electrode, and an area of the liquid crystal layer, which is opposed to the patch electrode, the first substrate has an incidence surface on a side opposite to a side opposed to the second substrate, and each of the reflection controllers is configured to adjust a phase of a radio wave made incident from the incidence surface side in accordance with a voltage applied to the patch electrode, and to reflect the radio wave toward the incidence surface side.

9. A phased array antenna comprising:

a first substrate including a plurality of antennas located in an emission area and arranged to be spaced apart along an X-axis, a plurality of phase control electrodes located in a phase control area adjacent to the emission area and being electrically independent of each other, and a first power supply pad located in a non-emission area outside the emission area and the phase control area;

a second substrate including a common electrode located in the phase control area and opposed to the plurality of phase control electrodes in a direction parallel to a Z-axis orthogonal to the X-axis, and a first power receiving pad located in the non-emission area, electrically connected to the common electrode, and overlapped with the first power supply pad in the direction parallel to the Z-axis;

a sealing material surrounding the phase control area and bonding the first substrate to the second substrate;

a liquid crystal layer held between the first substrate and the second substrate and surrounded by the sealing material; and a first transfer that is in contact with the first power supply pad and the first power receiving pad, wherein an uppermost layer of the first power supply pad, which is in contact with the first transfer, is formed of a transparent conductive material, the first power receiving pad is formed of a transparent conductive material, and the common electrode is formed of metal.

10. The phased array antenna according to claim 9, wherein an outer periphery of the common electrode is located on a side closer to the phase control area than an outer periphery of the sealing material, in plan view.

11. The phased array antenna according to claim 9, wherein the second substrate further includes an electrically insulating basement located in the emission area, the phase control area, and the non-emission area, the common electrode extends in the non-emission area and is in contact with the first power receiving pad in the non-emission area, and the first power receiving pad is located between the basement and the common electrode in a direction parallel to the Z-axis, in the non-emission area.

12. The phased array antenna according to claim 9, wherein the second substrate further includes a transparent conductive layer located in the non-emission area and formed of a transparent conductive material, and the transparent conductive layer includes an extending portion provided to be spaced from the common electrode in plan view, and the first power receiving pad overlapped with the common electrode in plan view and formed integrally with the extending portion.

13. The phased array antenna according to claim 9, wherein the second substrate further includes an electrically insulating basement located in the emission area, the phase control area, and the non-emission area, and a transparent conductive layer located in the phase control area and the non-emission area and formed of a transparent conductive material, the common electrode is in contact with the transparent conductive layer, and the transparent conductive layer includes the first power receiving pad and is located between the basement and the common electrode in a direction parallel to the Z-axis.

14. The phased array antenna according to claim 9, further comprising:

a second transfer, wherein the first substrate further includes a second power supply pad located in the non-emission area, the second substrate further includes a second power receiving pad located in the non-emission area, electrically connected to the common electrode, and overlapped with the second power supply pad in a direction parallel to the Z-axis, the second transfer is in contact with the second power supply pad and the second power receiving pad, an uppermost layer of the second power supply pad, which is in contact with the second transfer, is formed of a transparent conductive material, and the second power receiving pad is formed of a transparent conductive material.

15. The phased array antenna according to claim 9, wherein each of phase shifters includes a phase control electrode among the plurality of phase control electrodes, a portion of the common electrode, which is opposed to the phase control electrode, and an area of the liquid crystal layer, which is opposed to the phase control electrode, each of the phase control electrodes transmits a high-frequency signal to be input, to a corresponding antenna among the plurality of antennas, the phase shifter adjusts a phase of the high-frequency signal in accordance with a voltage applied to the phase control electrode, and each of the antennas is configured to emit a radio wave, based on the high-frequency signal.

* * * * *